US010027535B1

(12) United States Patent
Watsen

(10) Patent No.: US 10,027,535 B1
(45) Date of Patent: Jul. 17, 2018

(54) SYSTEMS AND METHODS FOR MANAGING DEVICE CONFIGURATIONS AT VARIOUS LEVELS OF ABSTRACTION

(71) Applicant: Juniper Networks, Inc., Sunnyvale, CA (US)

(72) Inventor: Kent A. Watsen, Leesburg, VA (US)

(73) Assignee: Juniper Networks, Inc., Sunnyvale, CA (US)

( * ) Notice: Subject to any disclaimer, the term of this patent is extended or adjusted under 35 U.S.C. 154(b) by 514 days.

(21) Appl. No.: 14/040,593

(22) Filed: Sep. 27, 2013

(51) Int. Cl.
*H04L 12/24* (2006.01)
*G06F 9/455* (2018.01)
*G06F 9/445* (2018.01)

(52) U.S. Cl.
CPC .......... *H04L 41/08* (2013.01); *G06F 9/44505* (2013.01); *G06F 9/45558* (2013.01); *H04L 41/0813* (2013.01)

(58) Field of Classification Search
CPC ..... H04L 51/00; H04L 41/08; H04L 41/0813; G06F 9/45505; G06F 9/45558
See application file for complete search history.

(56) References Cited

U.S. PATENT DOCUMENTS

| | | | | |
|---|---|---|---|---|
| 6,314,552 B1* | 11/2001 | Markov | ............... | G06F 17/5045 716/102 |
| 6,330,601 B1* | 12/2001 | French | ................. | H04Q 3/0095 709/223 |
| 7,197,546 B1* | 3/2007 | Bagga | ................. | H04L 41/0856 370/469 |
| 7,702,667 B2* | 4/2010 | Yahalom | ............. | H04L 67/1095 707/611 |
| 9,471,784 B1* | 10/2016 | Marr | ...................... | G06F 21/572 |
| 9,792,150 B1* | 10/2017 | Rangari | ............. | G06F 9/45558 |
| 2004/0243369 A1* | 12/2004 | Carey | ................. | G06F 17/5009 703/13 |
| 2005/0262232 A1* | 11/2005 | Cuervo | ................. | H04L 41/044 709/223 |
| 2009/0222877 A1* | 9/2009 | Diehl | .................. | H04L 63/0263 726/1 |
| 2010/0107015 A1* | 4/2010 | Bernabeu-Auban | .. | G06F 11/008 714/38.14 |
| 2012/0030673 A1* | 2/2012 | Sakamoto | ............. | G06F 21/121 718/1 |
| 2012/0144071 A1* | 6/2012 | Oshins | ................ | G06F 9/45558 710/8 |

(Continued)

OTHER PUBLICATIONS

Anuj Anand Mittal, et al; Systems and Methods for Testing and Analyzing Controller-Based Networks; U.S. Appl. No. 13/901,554, filed May 23, 2013.

(Continued)

*Primary Examiner* — Ramy M Osman
(74) *Attorney, Agent, or Firm* — FisherBroyles, LLP

(57) ABSTRACT

A computer-implemented method for managing device configurations at various levels of abstraction may include (1) receiving a request to transform configuration details of at least one computing device into configuration details for an abstraction of the computing device, (2) using at least one compiler to transform the configuration details of the computing device into configuration details of the abstraction, and (3) returning the configuration details of the abstraction. Various other methods, systems, and computer-readable media are also disclosed.

20 Claims, 11 Drawing Sheets

(56) References Cited

U.S. PATENT DOCUMENTS

| | | | |
|---|---|---|---|
| 2013/0060919 A1* | 3/2013 | Khandekar | G06F 9/45558 709/220 |
| 2013/0081099 A1* | 3/2013 | Sathish | G06F 21/6245 726/1 |
| 2013/0185715 A1* | 7/2013 | Dunning | G06F 9/45558 718/1 |
| 2013/0238641 A1* | 9/2013 | Mandelstein | G06F 17/30292 707/756 |
| 2014/0218397 A1* | 8/2014 | Rutman | G06T 3/4092 345/632 |
| 2016/0034300 A1* | 2/2016 | Fukushima | G06F 9/45558 718/1 |
| 2016/0315802 A1* | 10/2016 | Wei | H04L 41/06 |
| 2017/0302543 A1* | 10/2017 | Wu | H04L 41/0803 |

OTHER PUBLICATIONS

Apoorva Jindal, et al; Systems and Methods for Increasing the Scalability of Software-Defined Networks; U.S. Appl. No. 13/936,033, filed Jul. 5, 2013.

* cited by examiner

SYSTEMS AND METHODS FOR MANAGING DEVICE CONFIGURATIONS AT VARIOUS LEVELS OF ABSTRACTION

BACKGROUND

Traditional techniques for managing computing devices may enable computing devices to be configured using various levels of abstraction. For example, using traditional techniques, a network administrator may be able to manage a network by (1) configuring the network devices within the network and/or by (2) configuring abstractions of the network devices. By compiling configuration details of an abstraction of one or more computing devices into configuration details for the computing devices, some traditional techniques for managing computing devices using abstractions may enable an administrator to configure the abstraction without needing to configure the computing devices to implement the abstraction and/or without needing to understand how the computing devices will be configured to implement the abstraction.

Unfortunately, traditional techniques for managing computing devices using abstractions may present limitations. For example, an administrator who wishes to configure a computing device using multiple levels of abstraction may want or need to understand how changes to the configuration details of the computing device and/or an abstraction of the computing device may affect and/or conflict with the configuration details of other abstractions of the computing device. However, traditional techniques for managing computing devices using abstractions may require the administrator to manually determine how changes to the configuration details of a computing device and/or an abstraction of the computing device may affect and/or conflict with the configuration details of other abstractions of the computing device, which may be time consuming or even impossible for some systems. Thus, the instant disclosure identifies and addresses a need for improved systems and methods for managing device configurations at various levels of abstraction.

SUMMARY

As will be described in greater detail below, the instant disclosure generally relates to systems and methods for managing device configurations at various levels of abstraction. In one example, a computer-implemented method for managing device configurations at various levels of abstraction may include (1) receiving a request to transform configuration details of at least one computing device into configuration details for an abstraction of the computing device, (2) using at least one compiler to transform the configuration details of the computing device into configuration details of the abstraction, and (3) returning the configuration details of the abstraction.

Similarly, a system incorporating the above-described method may include (1) a receiving module that receives a request to transform configuration details of at least one computing device into configuration details for an abstraction of the computing device, (2) a compiling module that uses at least one compiler to transform the configuration details of the computing device into configuration details of the abstraction in response to the request to transform the configuration details of the computing device into configuration details for the abstraction, (3) a returning module that returns the configuration details of the abstraction in response to the request to transform the configuration details of the computing device into configuration details for the abstraction, and (4) at least one physical processor configured to execute the receiving module, the compiling module, and the returning module.

A corresponding non-transitory computer-readable medium may include one or more computer-readable instructions that may, when executed by at least one processor of a computing device, cause the computing device to (1) receive a request to transform configuration details of at least one computing device into configuration details for an abstraction of the computing device, (2) use at least one compiler to transform the configuration details of the computing device into configuration details of the abstraction, and (3) return the configuration details of the abstraction.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
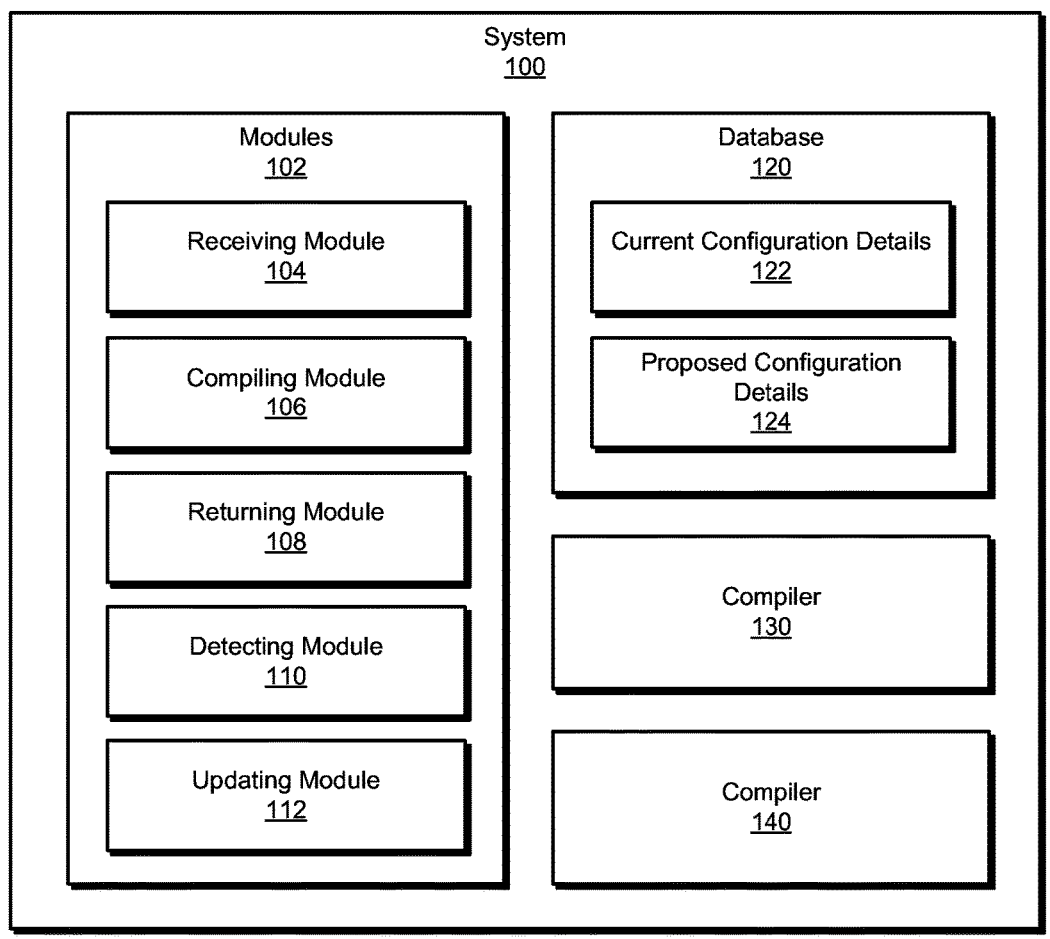
FIG. 1 is a block diagram of an exemplary system for managing device configurations at various levels of abstraction.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for managing device configurations at various levels of abstraction. As used herein, the term "level of abstraction" generally refers to a level within an abstraction hierarchy at which the systems and methods described herein manages and/or configures a computing device or abstraction. For example, physical computing devices may be managed and/or configured at the lowest level of an abstraction hierarchy (e.g., a level within an abstraction hierarchy with no abstraction) and may be referred to as level-zero abstractions. Abstractions that are abstractions of physical computing devices may be managed and/or configured at the next level of an abstraction hierarchy and may be referred to as level-one abstractions. A level-one abstraction may be implemented by compiling configuration details of the level-one abstraction into configuration details for the level-zero abstractions that will implement the level-one abstraction. Abstractions that are abstractions of level-one abstractions may be managed and/or configured at the next level of an abstraction hierarchy and may be referred to as level-two abstractions. A level-two abstraction may be implemented by compiling configuration details of the level-two abstraction into configuration details for the level-one abstractions that will implement the level-two abstraction, which may be compiled down into configuration details for the level-zero abstractions that will implement the level-one abstractions. In some examples, abstraction hierarchies may include any number of additional levels of abstraction.

Figure 4A:
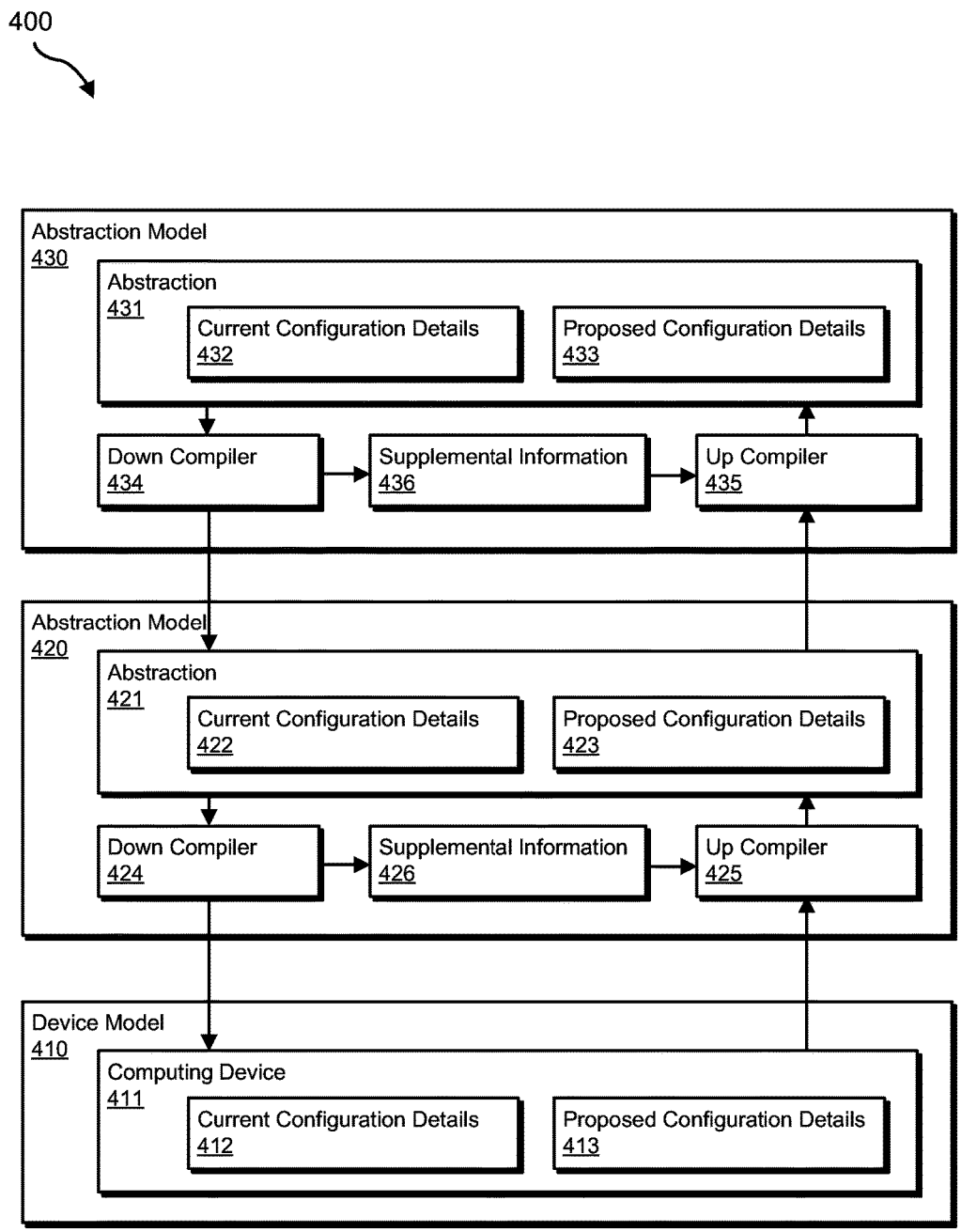
FIG. 4A is a block diagram of an exemplary system for managing device configurations at various levels of abstraction.

FIG. 4A illustrates an exemplary system 400 for managing device configurations using three levels of abstraction. As shown in FIG. 4A, exemplary system 400 may include a device model 410 for managing the configuration details of one or more computing devices (e.g., computing device 411). Exemplary system 400 may also include an abstraction model 420 for managing the configuration details of one or more level-one abstractions (e.g., abstraction 421) and an abstraction model 430 for managing the configuration details of one or more level-two abstractions (e.g., abstraction 431). In this example, abstraction 421 may represent an abstraction of computing device 411, and abstraction 431 may represent an abstraction of abstraction 421 and computing device 411. As such, abstraction 431 may be implemented by compiling configuration details of abstraction 431 into configuration details for abstraction 421, and abstractions 431 and 421 may be implemented by compiling configuration details of abstraction 421 into configuration details for computing device 411.

Figure 4B:
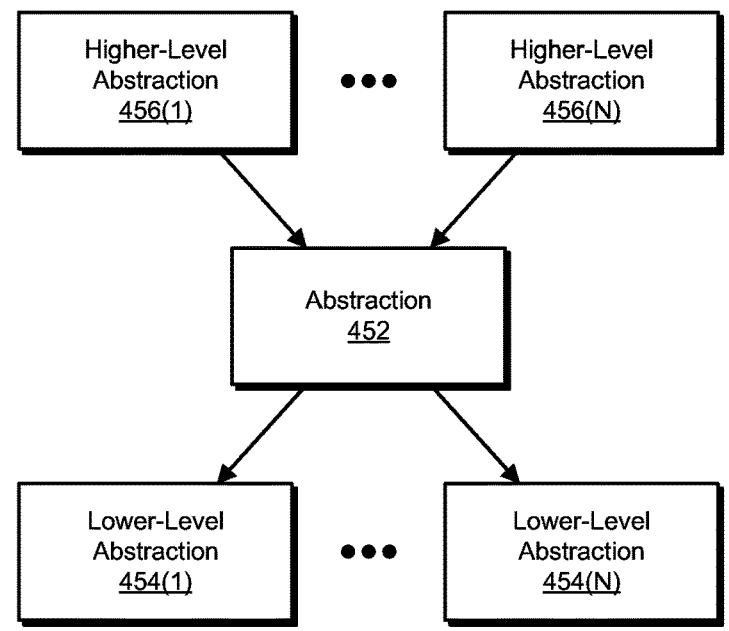
FIG. 4B is a block diagram of an exemplary system for managing device configurations at various levels of abstraction.

Although not illustrated in FIG. 4A, an abstraction may be an abstraction of more than one lower-level abstraction and/or may be used to implement more than one higher-level abstraction. For example, a level-two abstraction may be an abstraction of two or more different level-one abstractions, and a level-one abstraction may be used to implement two or more different level-two abstractions. Using exemplary system 450 in FIG. 4B as an additional example, abstraction 452 may be an abstraction of lower-level abstractions 454(1)-(N) and/or may be used to implement higher-level abstractions 456(1)-(N).

As used herein, the term "abstraction" generally refers to any logical abstraction of the configuration details of one or more physical computing devices and/or one or more lower-level abstractions. In some examples, an abstraction may provide or represent functionality that may be implemented by physical computing devices and/or lower-level abstractions. An abstraction may also provide or represent functionality that may be configured without regard to specific implementation details of these physical computing devices and/or lower-level abstractions. For example, a virtual private network (VPN) or a firewall may represent an abstraction of one or more network devices that provides and/or represents functionality that may be implemented by the network devices. A VPN or a firewall may also represent an abstraction of one or more network devices that may be configured without regard to specific implementation details of the network devices. Other examples of abstractions may include any abstraction developed by the INTERNET ENGINEERING TASK FORCE (IETF), DISTRIBUTED MANAGEMENT TASK FORCE (DMTF), and/or TM FORUM (such as, for example, abstractions defined by DMTF's COMMON INFORMATION MODEL (CIM) or TM FORUM's SHARED INFORMATION/DATA MODEL (SID)).

In some examples, the systems and methods described herein may manage device configurations at various levels of abstraction by using device models (e.g., device model 410 in FIG. 4A) to manage the configuration details of computing devices and abstraction models (e.g., abstraction models 420 and 430 in FIG. 4A) to manage the configuration details of abstractions. As used herein, the term "model" generally refers to any system that is capable of representing and/or managing the configuration and/or implementation details of a computing device and/or an abstraction. In some examples, a model may represent a portion of an application that manages the configuration and/or implementation details of computing devices and/or abstractions of computing devices. Additionally or alternatively, a model may include an add-on, an extension, or a plug-in that integrates with an application that manages computing devices and/or abstractions of computing devices. In at least one example, a model may represent an add-on, an extension, or a plug-in of a network management system (e.g., a VPN manager or a firewall manager).

In some examples, the systems and methods described herein may manage device configurations at various levels of abstraction by using models to maintain current and/or proposed configuration details for computing devices and/or abstractions. Using FIG. 4A as an example, the systems and methods described herein may use device model 410 to maintain current configuration details 412 and proposed configuration details 413 of computing device 411, abstraction model 420 to maintain current configuration details 422 and proposed configuration details 423 of abstraction 421, and abstraction model 430 to maintain current configuration details 432 and proposed configuration details 433 of abstraction 431. As will be explained below, current configuration details 412, 422, and 432 may correspond to a current configuration of computing device 411, and proposed configuration details 413, 423, and 433 may represent a set of related proposed configuration details associated with a consistent proposed configuration of computing device 411, abstraction 421, and/or abstraction 431.

As used herein, the term "configuration details" generally refers to any representation of a computing device or an abstraction that reflects a current or proposed configuration of the computing device or the abstraction. In some examples, configuration details may be stored as structured data within one or more databases (e.g., current configuration details 122 and/or proposed configuration details 124). Additionally or alternatively, configuration details may be stored as files (e.g., a structured text file, such as an .XML (eXtensible Markup Language) file).

As used herein, the term "current configuration details" generally refers to any representation of the current configuration of a computing device or any representation of the current configuration of an abstraction of the computing device that reflects the current configuration of the computing device. In some examples, the systems and methods described herein may use the current configuration details of a computing device and/or an abstraction of the computing device to provide an administrator with an understanding of the current configuration of the computing device and/or abstraction. In one example, the systems and methods described herein may use the current configuration details of a computing device or abstraction to provide an administrator with a starting point at which the administrator may propose modifications to the current configuration of the computing device or abstraction.

As will be explained in greater detail below, as the current configuration of a computing device changes, the systems and methods described herein may update the current configuration details of the computing device and/or abstractions of the computing device so that the current configuration details of the computing device and/or the abstractions are in sync with the current configuration of the computing device.

As used herein, the term "proposed configuration details" generally refers to any representation of a proposed configuration of a computing device or an abstraction of the computing device. The systems and methods described herein may use proposed configuration details to isolate proposed modifications to the current configuration of a computing device or abstraction from the current configuration of the computing device or abstraction. The systems and methods described herein may maintain separate and distinct proposed configuration details for a computing device and/or abstraction for each separate and distinct proposed modification to the current configuration of the computing device and/or abstraction.

As will be explained in greater detail below, as the current configuration of a computing device changes, the systems and methods described herein may update any proposed configuration details of the computing device and/or abstractions of the computing device so that the proposed configuration details of the computing device and/or abstractions remains in sync with the current configuration of the computing device.

In some examples, the systems and methods described herein may maintain, for each separate and distinct proposed modification to the current configuration of a computing device and/or abstraction, a set of related proposed configuration details that reflects how the proposed modification to the current configuration of the computing device and/or abstraction impacts current configuration details at higher and/or lower levels of abstraction. For example, proposed configuration details 413, 423, and 433 in FIG. 4A may represent a set of related proposed configuration details associated with a consistent proposed configuration of computing device 411, abstraction 421, and/or abstraction 431.

In at least one example, the systems and methods described herein may use a set of related proposed configuration details to enable an administrator to (1) see how modifications to the current and/or proposed configuration details at one level of abstraction may affect the current and/or proposed configuration details at another level of abstraction and/or (2) simultaneously view and/or modify configuration details at multiple levels of abstraction.

As will be explained in greater detail below, as a proposed modification to the current configuration of a computing device or abstraction changes, the systems and methods described herein may update the set of related proposed configuration details to reflect how the change to the proposed modification to the current configuration of the computing device and/or abstraction impacts the related proposed configuration details at higher and/or lower levels of abstraction.

In some examples, the systems and methods described herein may use proposed configuration details to enable an approval workflow whereby proposed modifications to the current configuration details of a computing device or abstraction may be submitted for approval before being pushed to the computing device. In at least one example, the systems and methods described herein may use a set of related proposed configuration details to enable an approver to view and/or review the proposed modifications at any level of an abstraction hierarchy.

In at least one example, proposed configuration details may become pending configuration details after they have been approved. As used herein, the term "pending configuration details" generally refers to proposed configuration details of a computing device or an abstraction of the computing device that correspond to a pending configuration of the computing device. In some examples, pending configuration details may represent proposed configuration details that are associated with an approved or pending configuration of a computing device that has been scheduled to be pushed to the computing device. In some examples, the systems and methods described herein may update pending configuration details of a computing device or an abstraction of the computing device to reflect changes to the current configuration of the computing device.

In addition to using models to maintain current and proposed configuration details of computing devices and/or abstractions, the systems and methods described herein may use models to maintain compilers for transforming configuration details of computing devices and/or abstractions into configuration details of higher or lower level abstractions. As used herein, the term "compiler" generally refers to any system or method (e.g., a set of rules) capable of transforming configuration details of a computing device or an abstraction of the computing device into configuration details for a higher-level abstraction of the computing device and/or any system or method capable of transforming the configuration details of an abstraction into configuration details for a computing device or a lower-level abstraction that implements the abstraction.

As used herein, the term "up compiler" generally refers to any system or method capable of transforming configuration details of a computing device or an abstraction of the computing device into configuration details for a higher-level abstraction of the computing device. Similarly, the term "down compiler" generally refers to any system or method capable of transforming the configuration details of an abstraction into configuration details for a computing device or a lower-level abstraction that implements the abstraction. As will be explained below, compilers may also include forward compilers and/or backward compilers.

As will be explained in greater detail below, the systems and methods described herein may manage device configurations at various levels of abstraction by using compilers to (1) transform configuration details of computing devices into configuration details for abstractions of the computing devices, (2) transform configuration details of abstractions of computing devices into configuration details for the computing devices and/or higher and/or lower level abstractions of the computing devices, and/or (3) transform configuration details of one version of an abstraction into configuration details for another version of the abstraction.

By using compilers to transform configuration details of computing devices into configuration details for abstractions of the computing devices, the systems and methods described herein may update the current and/or proposed configuration details of the abstractions to reflect changes to the current and/or proposed configuration details of the computing devices. Moreover, by using compilers to transform configuration details of an abstraction of computing devices into configuration details for the computing devices and/or higher and/or lower level abstractions of the computing devices, the systems and methods described herein may update the proposed configuration details of the computing devices and/or higher and/or lower level abstractions of the computing devices to reflect changes to the proposed configuration details of the abstraction.

In some examples, by updating the proposed configuration details of computing devices and/or higher and/or lower level abstractions of the computing devices to reflect changes to the proposed configuration details of an abstraction of the computing devices, the systems and methods described herein may enable an administrator to see how the changes to the proposed configuration details of the abstraction will be reflected at higher and/or lower levels of abstraction. Moreover, by updating the proposed configuration details of computing devices and/or higher and/or lower level abstractions of the computing devices to reflect changes to the proposed configuration details of an abstraction of the computing devices, the systems and methods described herein may enable the administrator to fluidly inspect and/or modify configuration details at any level of abstraction.

Furthermore, by using compilers to transform configuration details of one version of an abstraction of a computing device into configuration details for another version of the abstraction, the systems and methods described herein may enable abstractions and/or models for managing abstractions to be versioned, updated, and/or upgraded. Embodiments of the instant disclosure may also provide various other advantages and features, as discussed in greater detail below.

The following will provide, with reference to FIGS. 1, 2, 4, and 8, detailed descriptions of exemplary systems for managing device configurations at various levels of abstraction. Detailed descriptions of corresponding computer-implemented methods will also be provided in connection with FIGS. 3, 5-7, and 9. Finally, the discussion corresponding to FIG. 10 will provide numerous examples of systems that may include the components shown in FIGS. 1 and 2.

FIG. 1 is a block diagram of an exemplary system 100 for managing device configurations at various levels of abstraction. As illustrated in this figure, exemplary system 100 may include one or more modules 102 for performing one or more tasks. For example, and as will be explained in greater detail below, exemplary system 100 may include a receiving module 104 that receives a request to transform configuration details of at least one computing device into configuration details for an abstraction of the computing device. Exemplary system 100 may also include a compiling module 106 that uses at least one compiler to transform the configuration details of the computing device into configuration details of the abstraction. Exemplary system 100 may further include a returning module 108 that returns the configuration details of the abstraction.

In addition, and as will be described in greater detail below, exemplary system 100 may include a detecting module 110 that detects a change to how a computing device is currently configured. Exemplary system 100 may also include an updating module 112 that updates the configuration details of the computing device and/or an abstraction of the computing device to reflect the change. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., network devices 210(1)-(5), computing devices 220(1)-(10), and/or management server 230) and/or computing system 1000 in FIG. 10. One or more of modules 102 in FIG. 1 may also represent all or portions of one or more special-purpose computers configured to perform one or more tasks. In at least one example, one or more of modules 102 in FIG. 1 may represent all or portions of a network management system.

As illustrated in FIG. 1, exemplary system 100 may also include one or more databases, such as database 120. In one example, database 120 may include current configuration details 122 for storing information about current configuration details of one or more computing devices and/or abstractions and proposed configuration details 124 for storing information about proposed configuration details of one or more computing devices and/or abstractions.

Database 120 may represent portions of a single database or computing device or a plurality of databases or computing devices. For example, database 120 may represent a portion of management server 230 in FIG. 2 and/or computing system 1000 in FIG. 10. Alternatively, database 120 in FIG. 1 may represent one or more physically separate devices capable of being accessed by a computing device, such as management server 230 in FIG. 2 and/or computing system 1000 in FIG. 10.

As illustrated in FIG. 1, exemplary system 100 may also include one or more compilers, such as compilers 130 and 140. As will be described in greater detail below, compilers 130 and 140 may represent any system or method for transforming configuration details at one level of abstraction into configuration details at a higher or lower level of abstraction, such as the compilers illustrated in FIG. 4A (e.g., down compilers 424 and 434 and/or up compilers 425 and 435) and/or the compilers illustrated in FIG. 8 (e.g., forward compiler 817 and/or backward compiler 818).

Figure 2:
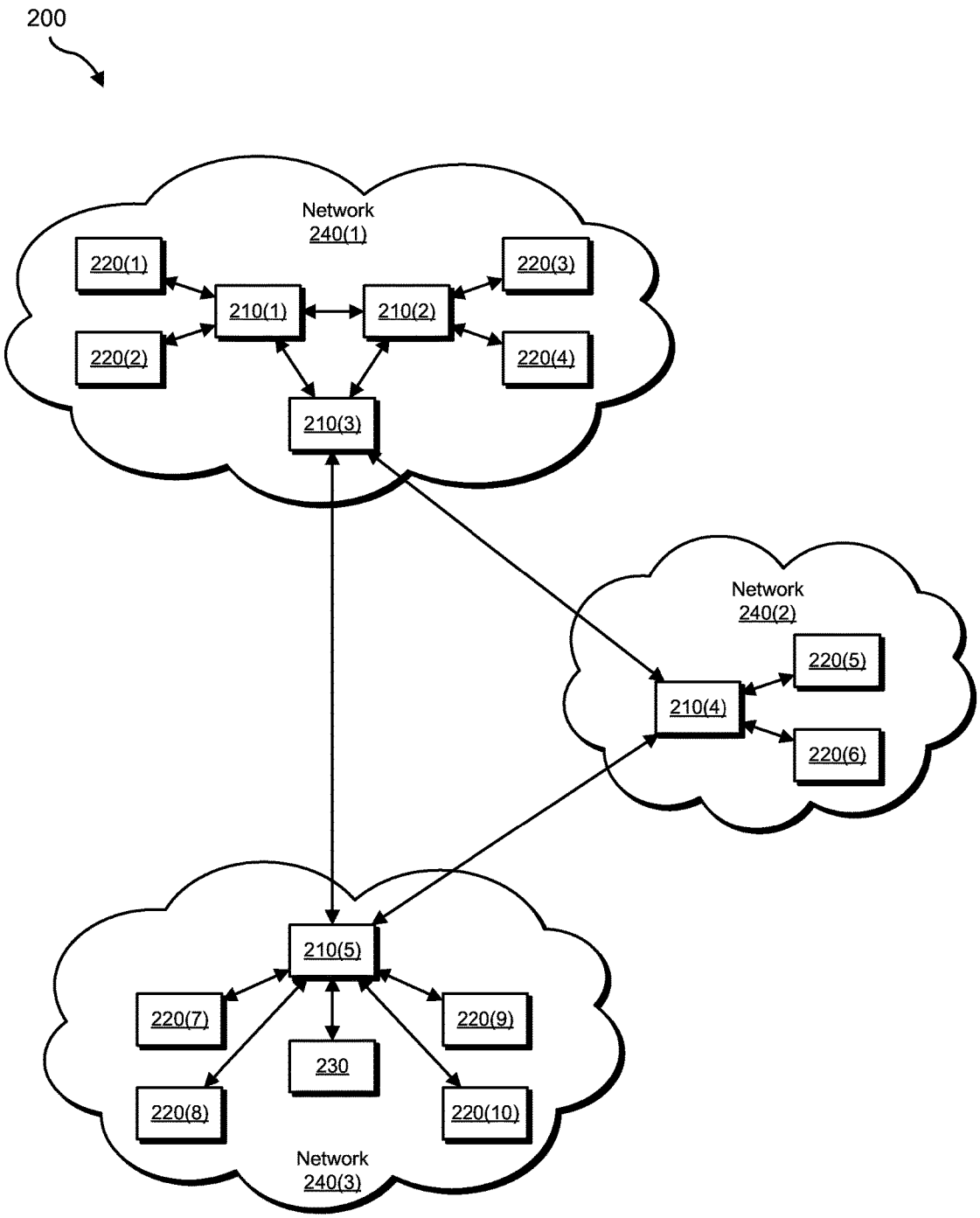
FIG. 2 is a block diagram of an exemplary system for managing device configurations at various levels of abstraction.

Exemplary system 100 in FIG. 1 may be implemented in a variety of ways. For example, all or a portion of exemplary system 100 may represent portions of exemplary system 200 in FIG. 2. As shown in FIG. 2, system 200 may include network devices 210(1)-(5), computing devices 220(1)-(10), and a management server 230 in communication via networks 240(1)-(3). In some examples, management server 230 may be programmed with one or more of modules 102 and/or may store all or a portion of the data in database 120. Additionally or alternatively, one or more of network devices 210(1)-(5) and/or computing devices 220(1)-(10) may be programmed with one or more of modules 102 and/or may store all or a portion of the data in database 120.

In one embodiment, one or more of modules 102 from FIG. 1 may, when executed by at least one processor of network devices 210(1)-(5), computing devices 220(1)-(10), and/or management server 230, facilitate network devices 210(1)-(5), computing devices 220(1)-(10), and/or management server 230 in managing device configurations within system 200 at various levels of abstraction. For example, and as will be described in greater detail below, one or more of modules 102 may cause network devices 210(1)-(5), computing devices 220(1)-(10), and/or management server 230 to (1) receive a request to transform configuration details of network devices 210(1)-(5) and/or computing devices 220(1)-(10) into configuration details for a high-level abstraction of network devices 210(1)-(5) and/or computing devices 220(1)-(10), (2) use at least one compiler (e.g., compiler 130 and/or 140) to transform the configuration details of network devices 210(1)-(5) and/or computing devices 220(1)-(10) into configuration details of the high-level abstraction, and (3) return the configuration details of the high-level abstraction.

In another example, one or more of modules 102 may cause network devices 210(1)-(5), computing devices 220 (1)-(10), and/or management server 230 to (1) receive a request to transform configuration details (e.g., current or proposed configuration details) of network devices 210(3)-(5) into configuration details for a full-mesh virtual private network (VPN) that connects networks 240(1)-(3), (2) use at least one compiler (e.g., compiler 130) to transform the configuration details of network devices 210(3)-(5) into configuration details of the full-mesh VPN, and (3) return the configuration details of the full-mesh VPN.

Network devices 210(1)-(5) generally represent any intermediary computing device that facilitates communication between two or more other computing devices within a computing environment. For example, network devices 210 (1)-(5) in FIG. 2 may facilitate communication between network devices 210(1)-(5), computing devices 220(1)-(10), and management server 230. Examples of network devices 210(1)-(5) include, without limitation, network bridges, multilayer switches, network hubs, signal repeaters, packet switches, and/or routers.

Computing devices 220(1)-(10) generally represent any type or form of computing device capable of reading computer-executable instructions. Examples of computing devices 220(1)-(10) include, without limitation, laptops, tablets, desktops, servers, cellular phones, Personal Digital Assistants (PDAs), multimedia players, embedded systems, combinations of one or more of the same, exemplary computing system 1000 in FIG. 10, or any other suitable computing device. In some examples, computing devices 220(1)-(10) may be configured via management server 230.

Management server 230 generally represents any type or form of computing device that is capable of reading computer-executable instructions and/or managing the configurations of one or more of network devices 210(1)-(5) and computing devices 220(1)-(10) at various levels of abstraction. Examples of management server 230 include, without limitation, application servers and database servers configured to provide various database services and/or run certain software applications. In at least one example, network devices 210(1)-(5) and/or computing devices 220(1)-(10) may be configured without the use of management server 230. For example, network devices 210(1)-(5) and/or computing devices 220(1)-(10) may be configured via a command-line interface or web-based user interface of network devices 210(1)-(5) and/or computing devices 220(1)-(10).

Networks 240(1)-(3) generally represent any medium or architecture capable of facilitating communication or data transfer. Examples of networks 240(1)-(3) include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), or the like. Networks 240(1)-(3) may facilitate communication or data transfer using wireless or wired connections. In one embodiment, networks 240(1)-(3) may facilitate communication between network devices 210(1)-(5), computing devices 220(1)-(10), and/or management server 230.

As shown in FIG. 2, networks 240(1)-(3) may be connected via a full-mesh VPN implemented by network devices 210(3)-(5). In one example, the full-mesh VPN may represent an abstraction of network devices 210(3)-(5). In at least one example, the systems and methods described herein may enable an administrator of system 200 to configure the full-mesh VPN in a way that does not require the administrator to configure network devices 210(3)-(5) to implement the full-mesh VPN or understand how network devices 210(3)-(5) will be configured to implement the full-mesh VPN. For example, the systems and methods described herein may have enabled the administrator to create the full-mesh VPN by simply selecting network devices 210(3)-(5) to implement the full-mesh VPN. After the administrator selected network devices 210(3)-(5) to implement the full-mesh VPN, the proposed configuration details of the full-mesh VPN may have simply indicated that network devices 210(3)-(5) should implement the full-mesh VPN. The systems and methods described herein may have then implemented the full-mesh VPN using network devices 210(3)-(5) by transforming the proposed configuration details of the full-mesh VPN into proposed configuration details of network devices 210(3)-(5). For example, the systems and methods described herein may have transformed the proposed configuration details of the full-mesh VPN into proposed configuration details of network devices 210(3)-(5) that indicated that (1) a VPN tunnel should exist between network devices 210(3) and 210(4), (2) a VPN tunnel should exist between network devices 210(3) and 210(5), and (3) a VPN tunnel should exist between network devices 210(4) and 210(5). The full-mesh VPN may have been created when the proposed configuration details of network devices 210(3)-(5) were pushed to network devices 210(3)-(5).

Figure 3:
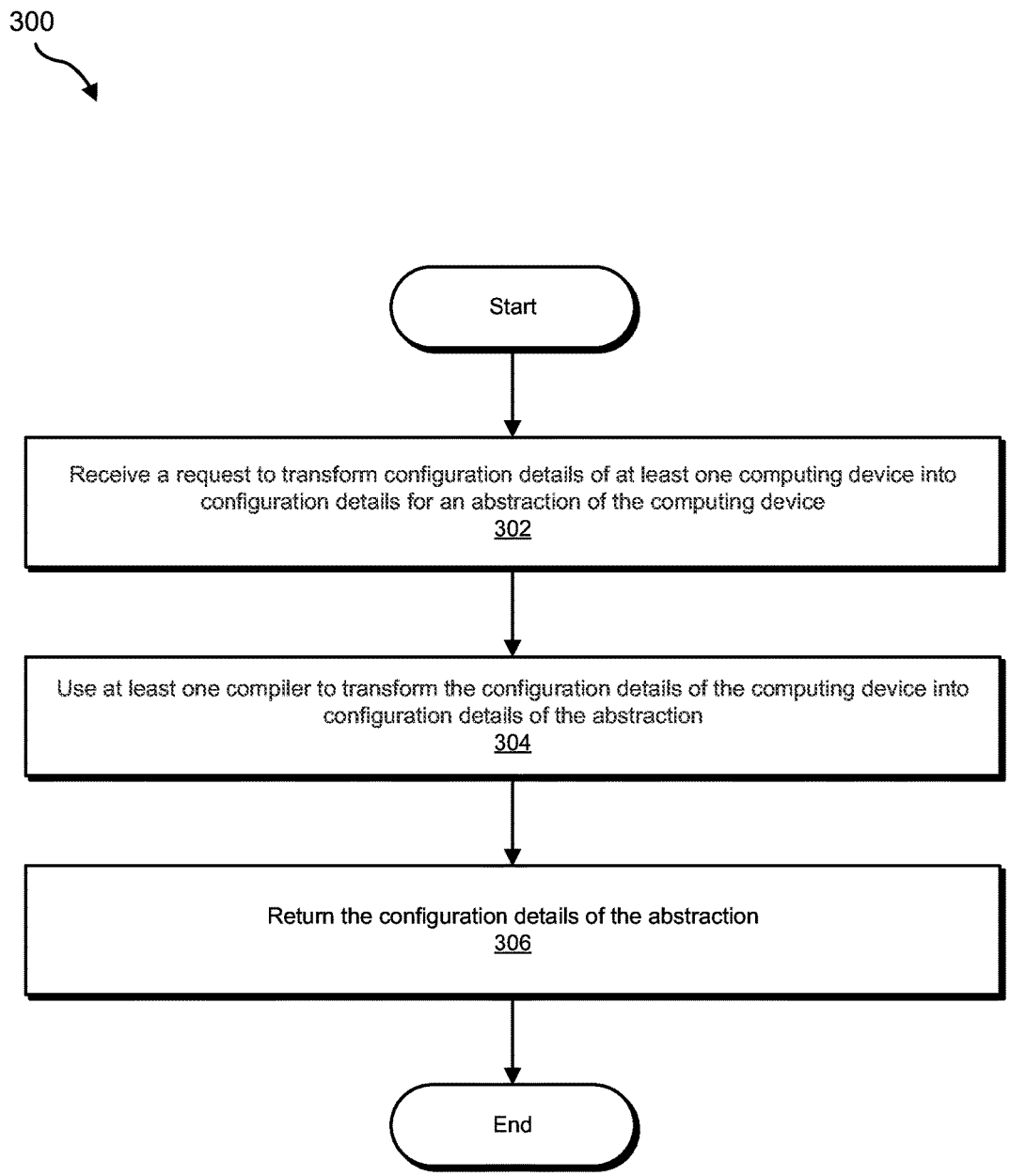
FIG. 3 is a flow diagram of an exemplary method for managing device configurations at various levels of abstraction.

FIG. 3 is a flow diagram of an exemplary computer-implemented method 300 for managing device configurations at various levels of abstraction. As will be explained in greater detail below, exemplary computer-implemented method 300 may enable changes to current and/or proposed configuration details of a computing device to be reflected in the current and/or proposed configuration details of any abstraction of the computing device. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, and/or computing system 1000 in FIG. 10.

As illustrated in FIG. 3, at step 302 one or more of the systems described herein may receive a request to transform configuration details of at least one computing device into configuration details for an abstraction of the computing device. For example, at step 302 receiving module 104 may, as part of management server 230 in FIG. 2, receive a request to transform configuration details of network devices 210(3)-(5) into configuration details for the full-mesh VPN that is implemented by network devices 210(3)-(5). Using FIG. 4A as an additional example, receiving module 104 may receive a request to transform current configuration details 412 of computing device 411 into configuration details for abstraction 421 and/or abstraction 431.

The systems described herein may perform step 302 in any suitable manner. For example, receiving module 104 may receive a request to update the current and/or proposed configuration details of an abstraction of a computing device to reflect a change to the current configuration details of the computing device. In some examples, receiving module 104 may receive requests to update the current and/or proposed configuration details of the abstraction whenever a change to the current configuration details of the computing device is detected. In at least one example, receiving module 104 may receive the request to update the current and/or proposed configuration details of the abstraction by detecting the change to the current configuration details of the computing device. By updating the current and/or proposed configuration details of an abstraction of a computing device whenever a change to the current configuration details of the computing device is detected, the systems and methods described herein may ensure that the current and/or proposed configuration details of the abstraction remain consistent with the current configuration details of the computing device.

Additionally or alternatively, receiving module 104 may receive a request to update proposed configuration details of an abstraction of a computing device to reflect a change to related proposed configuration details of the computing device. In some examples, receiving module 104 may receive requests to update the proposed configuration details of the abstraction whenever an administrator makes a change to related proposed configuration details of the computing device. In at least one example, receiving module 104 may receive the request to update the proposed configuration details of the abstraction by receiving a request, from the administrator, to modify related proposed configuration details of the computing device. By updating the proposed configuration details of the abstraction whenever an administrator makes a change to related proposed configuration details of the computing device, the systems and methods described herein may ensure that the proposed configuration details of the abstraction remain consistent with the related proposed configuration details of the computing device.

At step 304, one or more of the systems described herein may use at least one compiler to transform the configuration details of the computing device into configuration details of the abstraction. For example, at step 304 compiling module 106 may, as part of management server 230 in FIG. 2, use compiler 130 and/or 140 to transform the configuration details of network devices 210(3)-(5) into configuration details for the full-mesh VPN implemented by network devices 210(3)-(5). Using FIG. 4A as an additional example, compiling module 106 may use up compilers 425 and/or 435 to transform current configuration details 412 of computing device 411 into configuration details for abstractions 421 and/or 431.

The systems described herein may perform step 304 in any suitable manner. In one example, compiling module 106 may transform the configuration details of a computing device into configuration details for a level-one abstraction of the computing device by applying an up compiler of the level-one abstraction to the configuration details of the computing device. Using FIG. 4A as an example, compiling module 106 may transform current configuration details 412 of computing device 411 into configuration details for abstraction 421 by applying up compiler 425 to current configuration details 412.

In the event that the abstraction is a level-two abstraction, compiling module 106 may transform the configuration details of the computing device into configuration details for the level-two abstraction by first transforming the configuration details of the computing device into configuration details for the level-one abstraction on which the level-two abstraction depends (e.g., as described above) and then by applying the up compiler of the level-two abstraction to the configuration details of the level-one abstraction. Using FIG. 4A as an example, compiling module 106 may transform current configuration details 412 of computing device 411 into current configuration details for abstraction 431 by applying up compiler 425 and 435 to current configuration details 412.

In some examples, the configuration details of a computing device may correspond to more than one possible configuration of an abstraction of the computing device. In these situations, compiling module 106 may rely on supplemental information associated with the abstraction (e.g., supplemental information 426 and/or 436 in FIG. 4A) and/or input from an administrator to select the correct configuration for the abstraction. For example, in the event that compiling module 106 is unable to transform configuration details of a computing device into configuration details of an abstraction of the computing device using supplemental information associated with the configuration details of the computing device, compiling module 106 may request assistance from an administrator to complete the transformation.

In the event that compiling module 106 is transforming configuration details of a computing device into configuration details for an abstraction of the computing device for the purpose of updating the configuration details of the abstraction, compiling module 106 may flag the configuration details of the abstraction and/or the configuration details of any higher-level abstraction that depends on the abstraction as being out of sync until an administrator can provide any needed information and the transformation can be completed successfully.

At step 306, one or more of the systems described herein may return the configuration details of the abstraction. For example, at step 306 returning module 108 may, as part of management server 230 in FIG. 2, return the configuration details of the full-mesh VPN implemented using network devices 210(3)-(5). Using FIG. 4A as an additional example, returning module 108 may return current configuration details 422 of abstraction 421 and/or current configuration details 432 of abstraction 431.

The systems described herein may perform step 306 in any suitable manner. In general, returning module 108 may return the configuration details of an abstraction by using the configuration details of the abstraction to update the current and/or proposed configuration details of the abstraction. For example, if the configuration details of the abstraction correspond to current configuration details of the computing device, returning module 108 may use the configuration details of the abstraction to update the current and/or proposed configuration details of the abstraction. On the other hand, if the configuration details of the abstraction correspond to proposed configuration details of the computing device, returning module 108 may use the configuration details of the abstraction to update related proposed configuration details of the abstraction.

Additionally or alternatively, returning module 108 may return the configuration details of the abstraction by displaying the configuration details of the abstraction to an administrator of the abstraction so that the administrator can review how changes to the current and/or proposed configuration details of the computing device may affect the current and/or proposed configuration details of the abstraction. In at least one example, returning module 108 may return the configuration details of the abstraction by displaying the current and/or proposed configuration details of the abstraction that were updated using the configuration details of the abstraction. Upon completion of step 306, exemplary method 300 in FIG. 3 may terminate.

Figure 5:
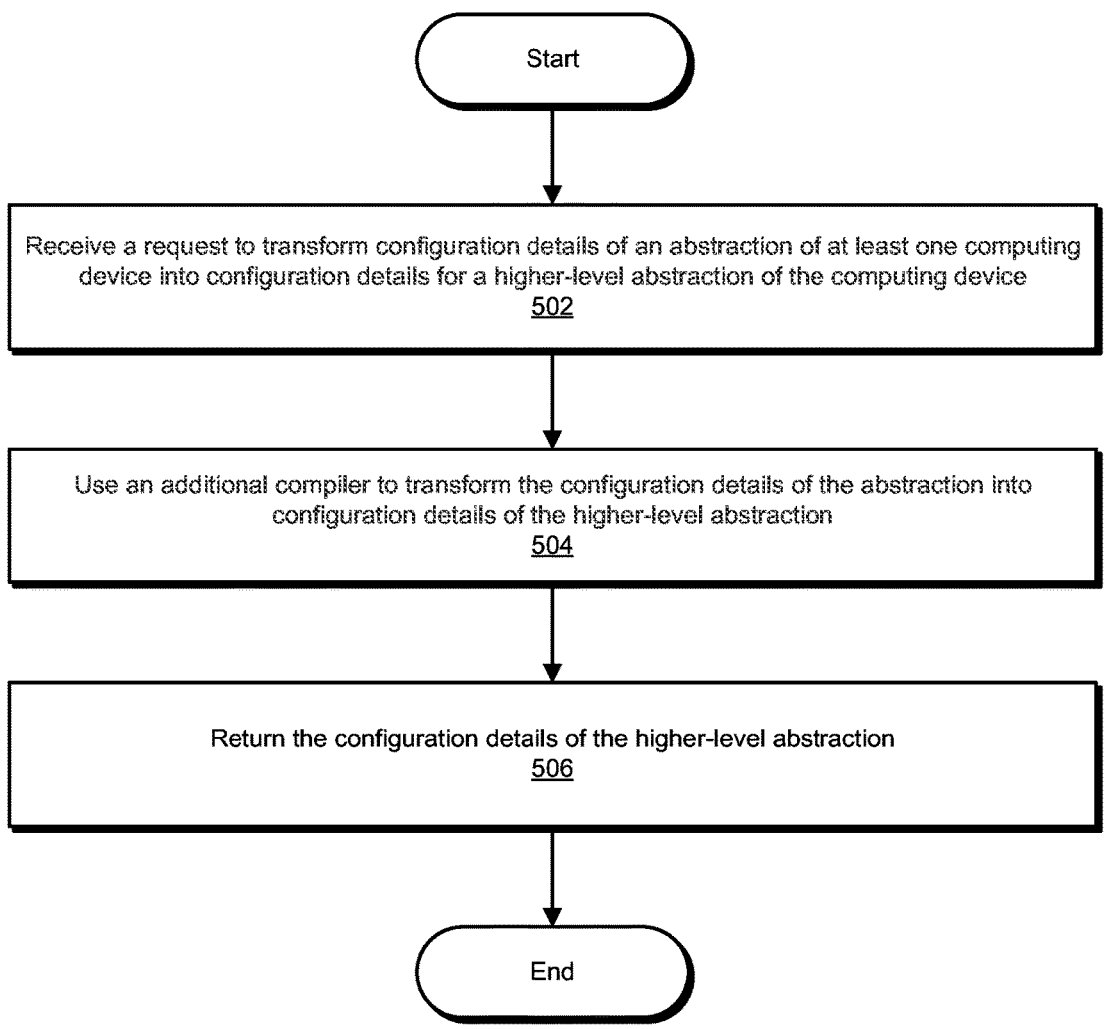
FIG. 5 is a flow diagram of an exemplary method for managing device configurations at various levels of abstraction.
Figure 6:
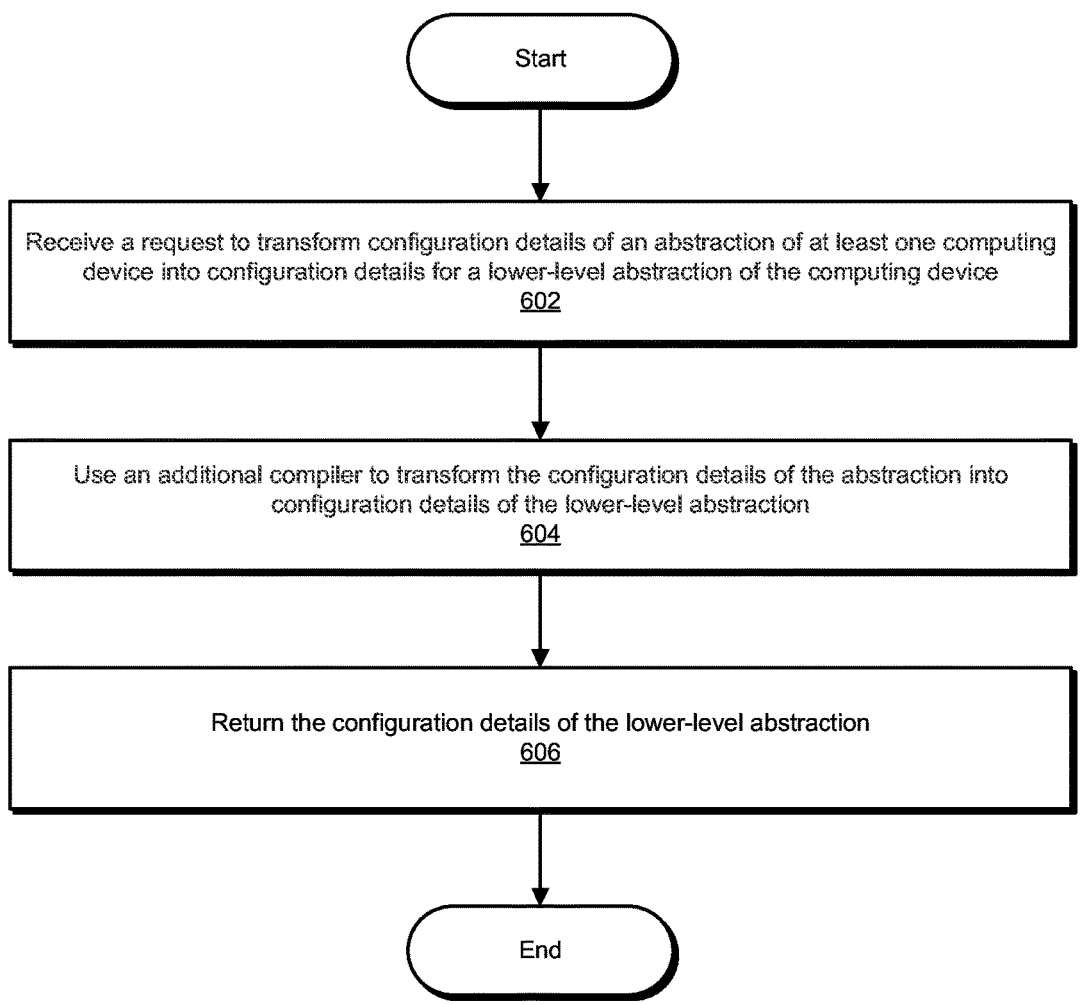
FIG. 6 is a flow diagram of an exemplary method for managing device configurations at various levels of abstraction.

FIGS. 5 and 6 illustrate how the systems and methods described herein may manage device configurations at various levels of abstraction by transforming configuration details of abstractions of computing devices into configuration details for the computing devices and/or higher and lower level abstractions of the computing devices. FIG. 5 is a flow diagram of an exemplary computer-implemented method 500 for managing device configurations at various levels of abstraction. As will be explained in greater detail below, exemplary computer-implemented method 500 may enable changes to proposed configuration details of an abstraction to be reflected in the proposed configuration details of any higher-level abstraction that depends on the abstraction. The steps shown in FIG. 5 may be performed by any suitable computer-executable code and/or computing system. In some embodiments, the steps shown in FIG. 5 may be performed by one or more of the components of system 100 in FIG. 1, system 200 in FIG. 2, and/or computing system 1000 in FIG. 10.

As illustrated in FIG. 5, at step 502 one or more of the systems described herein may receive a request to transform configuration details of an abstraction of at least one computing device into configuration details for a higher-level abstraction of the computing device. For example, at step 502 receiving module 104 may, as part of management server 230 in FIG. 2, receive a request to transform the configuration details of the full-mesh VPN implemented by network devices 210(3)-(5) into configuration details for a higher-level abstraction that depends on the full-mesh VPN. Using FIG. 4A as an additional example, receiving module 104 may receive a request to transform current configuration details 422 of abstraction 421 into configuration details for abstraction 431. As used herein, the phrase "higher-level abstraction" generally refers to any logical abstraction of an abstraction. Using FIG. 4A as an example, abstraction 431 may represent a higher-level abstraction of abstraction 421. An abstraction may have any number of higher-level abstractions.

The systems described herein may perform step 502 in any suitable manner. For example, receiving module 104 may receive a request to update the current and/or proposed configuration details of the higher-level abstraction to reflect a change to the current and/or proposed configuration details of the abstraction.

In some examples, receiving module 104 may receive a request to update the current and/or proposed configuration details of the higher-level abstraction whenever a change to the current and/or proposed configuration details of the abstraction is detected. For example, receiving module 104 may receive a request to update the proposed configuration details of the higher-level abstraction whenever an administrator makes a change to related proposed configuration details of the abstraction. In various examples, receiving module 104 may receive a request to update the current and/or proposed configuration details of the higher-level abstraction by detecting a change to the current and/or proposed configuration details of the abstraction and/or by receiving a request, from an administrator, to modify related proposed configuration details of the abstraction.

By updating the current and/or proposed configuration details of the higher-level abstraction whenever a change to the current and/or proposed configuration details of the abstraction is detected, the systems and methods described herein may ensure that the current and/or proposed configuration details of the higher-level abstraction remain consistent with the current and/or proposed configuration details of the abstraction.

At step 504, one or more of the systems described herein may use an additional compiler to transform the configuration details of the abstraction into configuration details of the higher-level abstraction. For example, at step 504 compiling module 106 may, as part of management server 230 in FIG. 2, use compiler 140 to transform the configuration details of the full-mesh VPN implemented by network devices 210(3)-(5) into configuration details of a higher-level abstraction that depends upon the full-mesh VPN. Using FIG. 4A as an additional example, compiling module 106 may transform current configuration details 422 of abstraction 421 into configuration details for abstraction 431. Step 504 is similar to step 304 in FIG. 3. Therefore, the previous discussions of step 304 may also apply to step 504.

At step 506, one or more of the systems described herein may return the configuration details of the higher-level abstraction. For example, at step 506 returning module 108 may, as part of management server 230 in FIG. 2, return the configuration details of the higher-level abstraction that depends on the full-mesh VPN implemented by network devices 210(3)-(5). Using FIG. 4A as an additional example, returning module 108 may return configuration details for abstraction 431.

The systems described herein may perform step 506 in any suitable manner. In general, returning module 108 may return the configuration details of a higher-level abstraction by using the configuration details of the higher-level abstraction to update the current and/or proposed configuration details of the higher-level abstraction. For example, if the configuration details of the higher-level abstraction correspond to current configuration details of an abstraction that implements the higher-level abstraction, returning module 108 may use the configuration details of the higher-level abstraction to update the current and/or proposed configuration details of the higher-level abstraction. On the other hand if the configuration details of the higher-level abstraction correspond to related proposed configuration details of the abstraction that implements the higher-level abstraction, returning module 108 may use the configuration details of the higher-level abstraction to update related proposed configuration details of the higher-level abstraction.

Additionally or alternatively, returning module 108 may return the configuration details of the higher-level abstraction by displaying the configuration details of the higher-level abstraction to an administrator of the higher-level abstraction so that the administrator can review how changes to the current and/or proposed configuration details of an abstraction that implements the higher-level abstraction may affect the current and/or proposed configuration details of the higher-level abstraction. In at least one example, returning module 108 may return the configuration details of the higher-level abstraction by displaying the current and/or proposed configuration details of the higher-level abstraction that were updated using the configuration details of the higher-level abstraction. Upon completion of step 506, exemplary method 500 in FIG. 5 may terminate.

FIG. 6 is a flow diagram of an exemplary computer-implemented method 600 for managing device configurations at various levels of abstraction. As will be explained in greater detail below, exemplary computer-implemented method 600 may enable changes to proposed configuration details of an abstraction to be reflected in the proposed configuration details of any computing device or lower-level abstraction that may implement the abstraction. The steps shown in FIG. 6 may be performed by any suitable computer-executable code and/or computing system. In some embodiments, the steps shown in FIG. 6 may be performed by one or more of the components of system 100 in FIG. 1, system 200 in FIG. 2, and/or computing system 1000 in FIG. 10.

As illustrated in FIG. 6, at step 602 one or more of the systems described herein may receive a request to transform configuration details of an abstraction of at least one computing device into configuration details for a lower-level abstraction of the computing device. For example, at step 602 receiving module 104 may, as part of management server 230 in FIG. 2, receive a request to transform proposed configuration details of the full-mesh VPN implemented by network devices 210(3)-(5) into configuration details for network devices 210(3)-(5). Using FIG. 4A as an additional example, receiving module 104 may receive a request to transform proposed configuration details 433 of abstraction 431 into configuration details for abstraction 421 and/or computing device 411.

As used herein, the term "lower-level abstraction" generally refers to any computing device or abstraction on which an abstraction depends and/or any computing device or abstraction by which an abstraction is implemented. Using FIG. 4A as an example, abstraction 421 may represent a lower-level abstraction of abstraction 431, and computing device 411 may represent a lower-level abstraction of abstractions 431 and 421.

The systems described herein may perform step 602 in any suitable manner. For example, receiving module 104 may receive a request to update proposed configuration details of a lower-level abstraction to reflect a change to related proposed configuration details of an abstraction. In some examples, receiving module 104 may receive a request to update the proposed configuration details of the lower-level abstraction whenever an administrator makes a change to related proposed configuration details of the abstraction. In at least one example, receiving module 104 may receive a request to update the proposed configuration details of the lower-level abstraction by receiving a request, from the administrator, to modify related proposed configuration details of the abstraction.

By updating the proposed configuration details of the lower-level abstraction whenever an administrator makes a change to related proposed configuration details of the abstraction, the systems and methods described herein may ensure that the proposed configuration details of the lower-level abstraction remain consistent with the related proposed configuration details of the abstraction.

At step 604, one or more of the systems described herein may use an additional compiler to transform the configuration details of the abstraction into configuration details of the lower-level abstraction. For example, at step 604 compiling module 106 may, as part of management server 230 in FIG. 2, use compiler 140 to transform proposed configuration details of the full-mesh VPN implemented by network devices 210(3)-(5) into configuration details for network devices 210(3)-(5). Using FIG. 4A as an additional example, compiling module 106 may transform proposed configuration details 433 of abstraction 431 into configuration details for abstraction 421 and/or computing device 411.

The systems described herein may perform step 604 in any suitable manner. For example, compiling module 106 may transform the configuration details of a level-one abstraction of a computing device into configuration details for the computing device by applying the down compiler of the level-one abstraction to the configuration details of the level-one abstraction. Using FIG. 4A as an example, compiling module 106 may transform proposed configuration details 423 of abstraction 421 into configuration details for computing device 411 by applying down compiler 424 to proposed configuration details 423.

In another example, compiling module 106 may transform the configuration details of a level-two abstraction of a computing device into configuration details for the computing device by first transforming the configuration details of the level-two abstraction into configuration details for the level-one abstraction on which the level-two abstraction depends and then applying the down compiler of the level-one abstraction that is associated with the computing device to the configuration details of the level-one abstraction. Using FIG. 4A as an example, compiling module 106 may transform proposed configuration details 433 of computing device 431 into configuration details for computing device 411 by applying down compilers 424 and 434 to proposed configuration details 433.

In some examples, the configuration details of a lower-level abstraction may correspond to more than one possible configuration of an abstraction. Therefore in some examples, compiling module 106 may generate and maintain supplemental information for an abstraction that is associated with the configuration details of a lower-level abstraction and that may enable the configuration details of the lower-level abstraction to be transformed into configuration details for the abstraction.

At step 606, one or more of the systems described herein may return the configuration details of the lower-level abstraction. For example, at step 606 returning module 108 may, as part of management server 230 in FIG. 2, return configuration details of network devices 210(3)-(5). Using FIG. 4A as an additional example, returning module 108 may return configuration details for abstraction 421 and/or computing device 411.

The systems described herein may perform step 606 in any suitable manner. In general, returning module 108 may return the configuration details of a lower-level abstraction by using the configuration details to update proposed configuration details of the lower-level abstraction. For example, if the configuration details of the lower-level abstraction correspond to proposed configuration details of the abstraction, returning module 108 may use the configuration details of the lower-level abstraction to update related proposed configuration details of the lower-level abstraction.

Additionally or alternatively, returning module 108 may return the configuration details of the lower-level abstraction by displaying the configuration details of the lower-level abstraction to an administrator of the lower-level abstraction so that the administrator can see how changes to the proposed configuration details of the abstraction may affect the proposed configuration details of the lower-level abstraction. In at least one example, returning module 108 may return the configuration details of the lower-level abstraction by displaying the proposed configuration details of the lower-level abstraction that were updated using the configuration details of the lower-level abstraction. Upon completion of step 606, exemplary method 600 in FIG. 6 may terminate.

In some examples, the systems and methods described herein may transform configuration details of one version of an abstraction into configuration details of another version of the abstraction. As will be explained below, by transforming configuration details of one version of an abstraction into configuration details of another version of the abstraction, the systems and methods described herein may enable abstractions and/or abstraction models to be independently versioned, updated, or upgraded.

Figure 7:
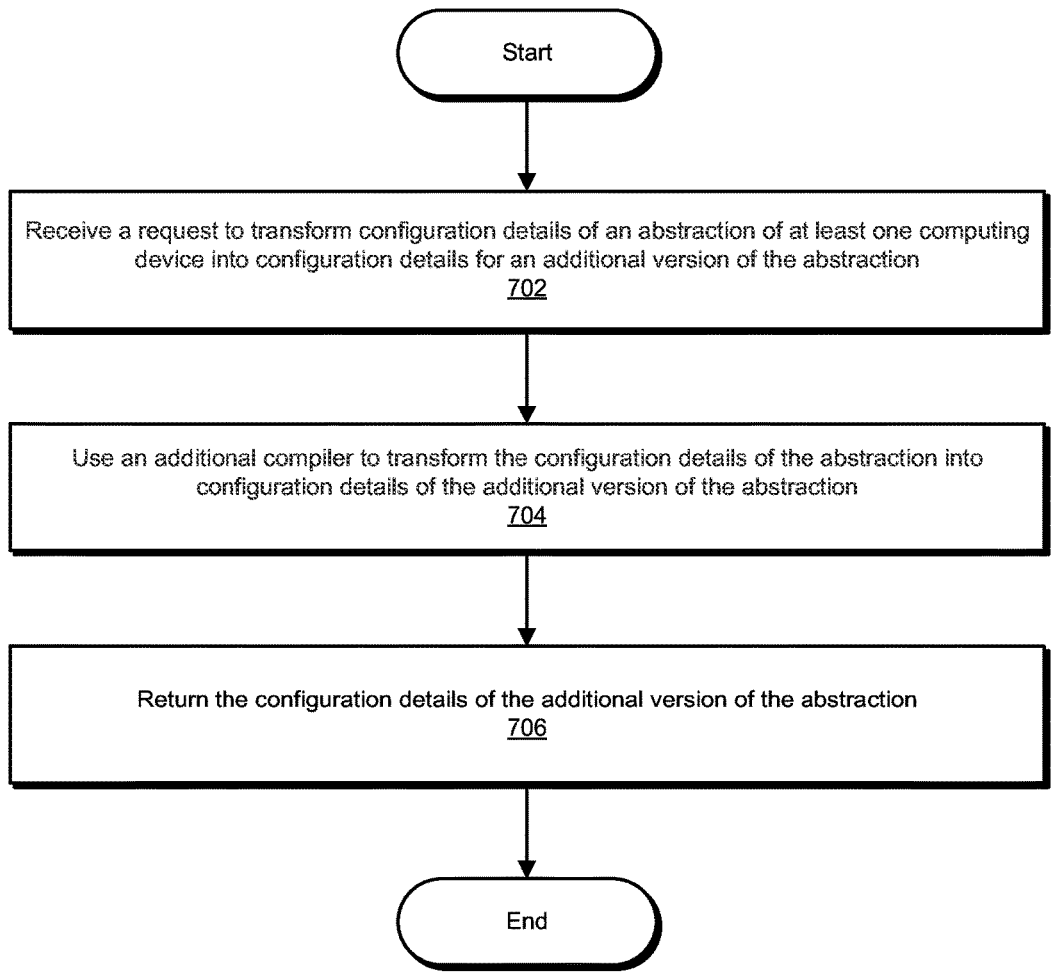
FIG. 7 is a flow diagram of an exemplary method for managing device configurations at various levels of abstraction.

FIG. 7 is a flow diagram of an exemplary computer-implemented method 700 for managing device configurations at various levels of abstraction. As will be explained in greater detail below, exemplary computer-implemented method 700 may enable the transformation of configuration details of one version of an abstraction into configuration details of another version of the abstraction. The steps shown in FIG. 7 may be performed by any suitable computer-executable code and/or computing system. In some embodiments, the steps shown in FIG. 7 may be performed by one or more of the components of system 100 in FIG. 1, system 200 in FIG. 2, and/or computing system 1000 in FIG. 10.

As illustrated in FIG. 7, at step 702 one or more of the systems described herein may receive a request to transform configuration details of an abstraction of at least one computing device into configuration details for an additional version of the abstraction. For example, at step 702 receiving module 104 may, as part of management server 230 in FIG. 2, receive a request to transform configuration details for the full-mesh VPN implemented by network devices 210(3)-(5) into configuration details for an older version of the full-mesh VPN. Using FIG. 8 as an additional example, receiving module 104 may receive a request to transform current configuration details 812 of abstraction 811 into configuration details for an older version of abstraction 811.

As used herein, the phrase "newer version of an abstraction" generally refers to any updated abstraction. A newer version of an abstraction may be created when the abstraction model that manages the abstraction is updated (e.g., to add new functionalities and/or features to the abstraction). Similarly, the phrase "older version of an abstraction," as used herein, generally refers to any abstraction before it is updated.

As mentioned above, abstractions and/or abstraction models may be independently versioned, updated, and/or upgraded. As a result, a higher-level abstraction may become dependent on an older version of an abstraction and/or may be incompatible with a newer version of an abstraction. For example, a down compiler associated with the higher-level abstraction may output configuration details of the older version of the abstraction, and an up compiler associated with the higher-level abstraction may take as input configuration details of the older version of the abstraction. For at least this reason, an updated abstraction model may maintain one or more compilers that are capable of transforming configuration details of an abstraction into configuration details for an additional version of the abstraction to enable backwards compatibility with higher-level abstractions and/or to update the abstraction.

Figure 8:
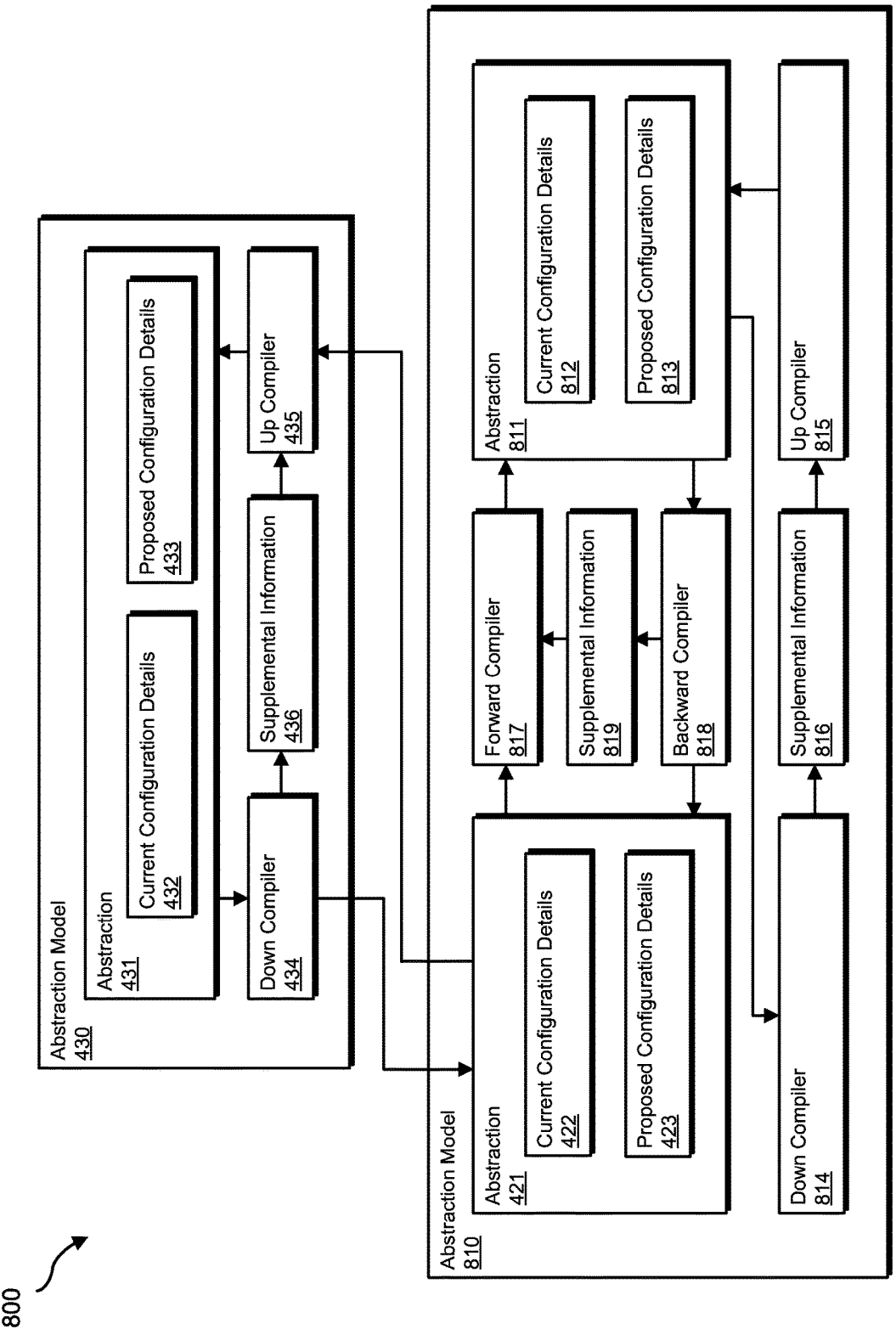
FIG. 8 is a block diagram of exemplary systems for managing device configurations at various levels of abstraction.

FIG. 8 illustrates an example of an updated abstraction model and a newer version of an abstraction. As shown in FIG. 8, abstraction model 810 may represent an updated version of abstraction model 420 in FIG. 4A. Similarly, abstraction 811 may represent a newer version of abstraction 421 in FIG. 4A. Abstraction model 810 may also include an updated down compiler 814 and an updated up compiler 815. In at least one example, down compiler 434 of abstraction model 430 may output configuration details that are incompatible with abstraction 811, and up compiler 435 may be unable to take as input configuration details of abstraction 811 (e.g., current configuration details 812 and/or proposed configuration details 813). As such, abstraction model 810 may include a forward compiler 817 and a backward compiler 818 to enable backwards compatibility with abstraction model 430 and abstraction 431.

Returning to FIG. 7, the systems described herein may perform step 702 in any suitable manner. For example, receiving module 104 may receive a request to transform configuration details of an abstraction into configuration details for a newer version of the same abstraction. In one example, receiving module 104 may receive the request to transform the configuration details of the abstraction into configuration details for a newer version of the abstraction by receiving a request to update proposed configuration details of the newer version of the abstraction to reflect a change to related proposed configuration details of a higher-level abstraction whose down compiler is unable to generate configuration details for the newer version of the abstraction.

Additionally or alternatively, receiving module 104 may receive a request to transform configuration details of an abstraction into configuration details for an older version of the same abstraction. In one example, receiving module 104 may receive the request to transform the configuration details of an abstraction into configuration details for an older version of the abstraction by receiving a request to update the current and/or proposed configuration details of a higher-level abstraction (e.g., a higher-level abstraction whose up compiler is unable to take as input configuration details of the newer version of the abstraction) to reflect a change to current and/or proposed configuration details of the abstraction.

At step 704, one or more of the systems described herein may use an additional compiler to transform the configuration details of the abstraction into configuration details of the additional version of the abstraction. For example, at step 704 compiling module 106 may, as part of management server 230 in FIG. 2, use compiler 140 to transform configuration details of the full-mesh VPN implemented by network devices 210(3)-(5) into configuration details for an older version of the full-mesh VPN. Using FIG. 8 as an additional example, compiling module 106 may use backward compiler 818 to transform current configuration details 812 of abstraction 811 into current configuration details of an older version of abstraction 811.

The term "forward compiler" generally refers to any system or method capable of transforming configuration details of an older version of an abstraction into configuration details for a newer versions of the abstraction. The term "backward compiler" generally refers to any system or method capable of transforming configuration details of a newer version of an abstraction into configuration details for an older version of the abstraction.

The systems described herein may perform step 704 in any suitable manner. In one example, compiling module 106 may transform configuration details of an abstraction into configuration details for a newer version of the abstraction by applying the forward compiler of the newer version of the abstraction to the configuration details of the abstraction. Using FIG. 8 as an example, compiling module 106 may transform configuration details outputted by down compiler 434 into configuration details for abstraction 811 by applying forward compiler 817 to the configuration details outputted by down compiler 434.

In some examples, the configuration details of an older version of an abstraction may correspond to more than one possible configuration of a newer version of the abstraction. In these situations, compiling module 106 may rely on supplemental information associated with the newer version of the abstraction and/or input from an administrator to select the correct configuration for the newer version of the abstraction. Using FIG. 8 as an example, compiling module 106 may use supplemental information 819 to transform configuration details outputted by down compiler 434 into configuration details for abstraction 811.

In some examples, compiling module 106 may transform configuration details of an abstraction into configuration details for an older version of the same abstraction by applying the backward compiler of the abstraction to the configuration details of the abstraction. Using FIG. 8 as an example, compiling module 106 may transform current configuration details 812 of abstraction 811 into configuration details for an older version of abstraction 811 by applying backward compiler 818 to current configuration details 812.

As mentioned above, an older version of an abstraction may correspond to more than one possible configuration of a newer version of the abstraction. Therefore in some examples, compiling module 106 may generate and maintain supplemental information for a newer version of an abstraction that enables the configuration details of an older version of the abstraction to be transformed into configuration details for the newer version of the abstraction. Using FIG. 8 as an example, compiling module 106 may generate and maintain supplemental information 819 for abstraction 811.

At step 706, one or more of the systems described herein may return the configuration details of the additional version of the abstraction. For example, at step 706 returning module 108 may, as part of management server 230 in FIG. 2, return the configuration details of the older version of the full-mesh VPN implemented by network devices 210(3)-(5). Using FIG. 8 as an additional example, returning module 108 may return current configuration details of an older version of abstraction 811. Upon completion of step 706, exemplary method 700 in FIG. 7 may terminate.

Figure 9:
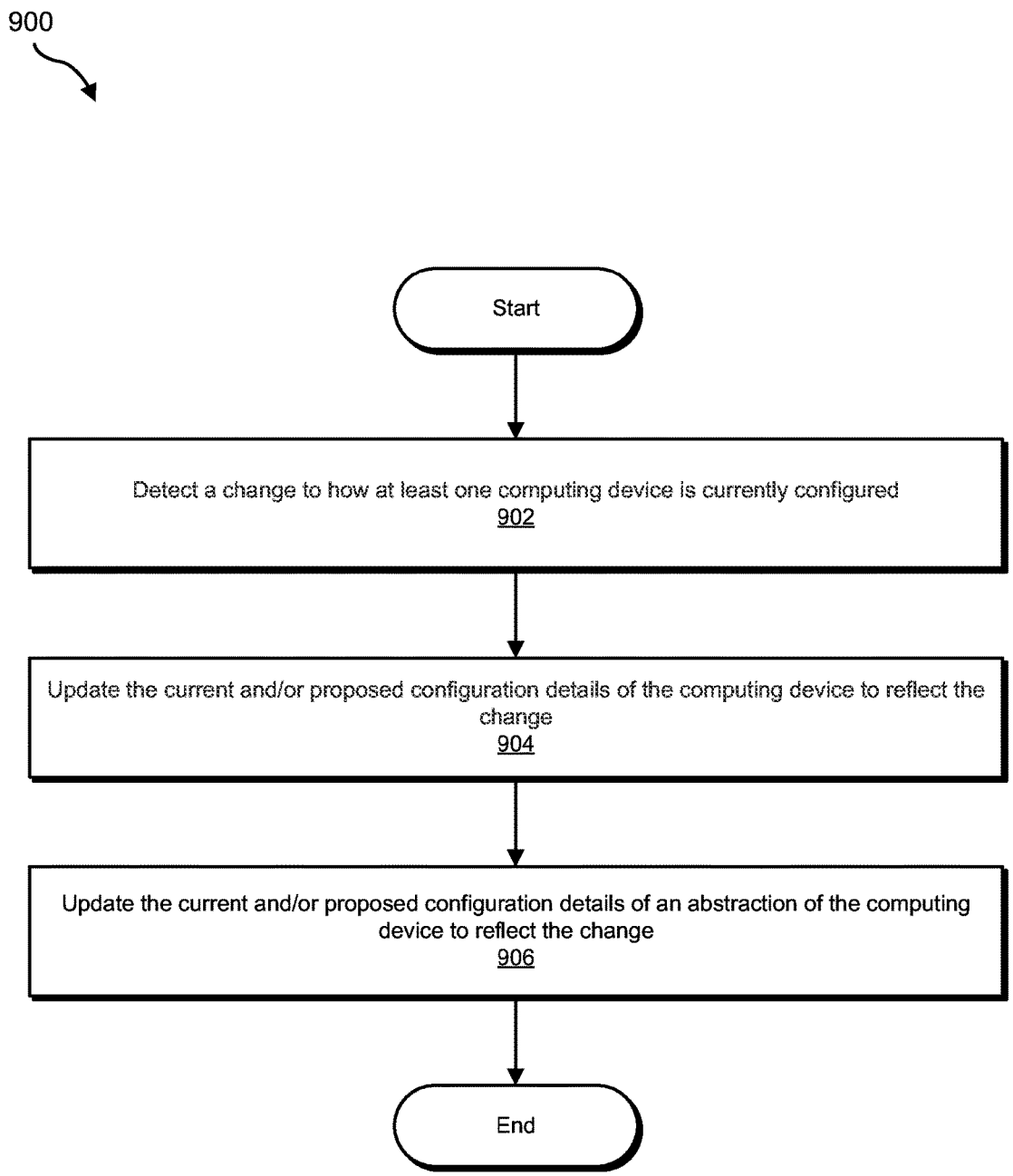
FIG. 9 is a flow diagram of an exemplary method for managing device configurations at various levels of abstraction.

FIG. 9 is a flow diagram of an exemplary computer-implemented method 900 for managing device configurations at various levels of abstraction. As will be explained in greater detail below, exemplary computer-implemented method 900 may enable the management of device configurations at one or more levels of abstraction by enabling the maintenance of consistent configuration details at each level of abstraction. The steps shown in FIG. 9 may be performed by any suitable computer-executable code and/or computing system. In some embodiments, the steps shown in FIG. 9 may be performed by one or more of the components of system 100 in FIG. 1, system 200 in FIG. 2, and/or computing system 1000 in FIG. 10.

As illustrated in FIG. 9, at step 902 one or more of the systems described herein may detect a change to how at least one computing device is currently configured. For example, at step 902 detecting module 110 may, as part of management server 230 in FIG. 2, detect a change to how one or more of network devices 210(1)-(5) and/or computing devices 220(1)-(10) are currently configured. Using FIG. 4A as an additional example, detecting module 110 may detect a change to how computing device 411 is currently configured.

The systems described herein may perform step 902 in any suitable manner. In one example, detecting module 110 may detect a change to how a computing device is currently configured by (1) obtaining information from the computing device that details how the computing device is currently configured and (2) detecting a difference between how the computing device is currently configured and the current configuration details associated with the computing device. For example, detecting module 110 may detect a change to how computing device 411 in FIG. 4A is currently configured by (1) obtaining information from computing device 411 that details how computing device 411 is currently configured and (2) detecting a difference between how computing device 411 is currently configured and current configuration details 412 associated with computing device 411. Additionally or alternatively, detecting module 110 may detect a change to how a computing device is currently configured by detecting when pending configuration details associated with the computing device have been successfully pushed to the computing device.

At step 904, one or more of the systems described herein may update the current and/or proposed configuration details of the computing device to reflect the change. For example, at step 904 updating module 112 may, as part of management server 230 in FIG. 2, update the current and/or proposed configuration details of one or more of network devices 210(1)-(5) and/or computing devices 220(1)-(10) to reflect any changes to how network devices 210(1)-(5) and/or computing devices 220(1)-(10) are currently configured. Using FIG. 4A as an additional example, updating module 112 may update current configuration details 412 and proposed configuration details 413 of computing device 411 to reflect any changes to how computing device 411 is currently configured.

The systems described herein may perform step 904 in any suitable manner. In one example, updating module 112 may update the current configuration details of the computing device by incorporating the change to the current configuration of the computing device into the current configuration details of the computing device such that the current configuration details of the computing device mirrors the current configuration of the computing device. Similarly, updating module 112 may update any proposed configuration details of the computing device by incorporating the change to the current configuration of the computing device into the proposed configuration details of the computing device such that the proposed configuration details of the computing device mirrors the current configuration of the computing device.

In addition to or as an alternative to updating the proposed configuration details of the computing device, updating module 112 may also determine whether the change to how the computing device is currently configured conflicts with any proposed configuration details of the computing device. In the event that updating module 112 determines that a change conflicts with proposed configuration details of the computing device, updating module 112 may notify an administrator of the conflict so that the administrator may resolve the conflict.

At step 906, one or more of the systems described herein may update the current and/or proposed configuration details of an abstraction of the computing device to reflect the change. For example, at step 906 updating module 112 may, as part of management server 230 in FIG. 2, update the current and/or proposed configuration details of the full-mesh VPN implemented by network devices 210(3)-(5) to reflect any changes to how network devices 210(3)-(5) are currently configured. Using FIG. 4A as an additional example, updating module 112 may update the current and/or proposed configuration details of abstractions 421 and 431 to reflect any changes to how computing device 411 is currently configured.

The systems described herein may perform step 906 in any suitable manner. For example, updating module 112 may update the current and/or proposed configuration details of an abstraction of a computing device to reflect the change to how the computing device is currently configured by transforming the updated current configuration details of the computing device into configuration details for the abstraction and by using the configuration details for the abstraction to update the current and/or proposed configuration details of the abstraction (e.g., as described above in connection with FIG. 3).

In addition to or as an alternative to updating the proposed configuration details of the abstraction, updating module 112 may also determine whether the change to how the computing device is currently configured conflicts with any proposed configuration details of the abstraction. In the event that updating module 112 determines that a conflict exists, updating module 112 may notify an administrator of the conflict so that the administrator may resolve the conflict.

In at least one example, updating module 112 may recursively update current and/or proposed configuration details at each level of abstraction to reflect any changes to how the computing device is currently configured. Using FIG. 4A as an example, updating module 112 may update current configuration details 432 of abstraction 431 by (1) updating current configuration details 412 of computing device 411, (2) using updated current configuration details 412 of computing device 411 to update current configuration details 422 of abstraction 421, and (3) using updated current configuration details 422 of abstraction 421 to update current configuration details 432 of abstraction 431. Upon completion of step 906, exemplary method 900 in FIG. 9 may terminate.

As explained above, by using compilers to transform configuration details of computing devices into configuration details for abstractions of the computing devices, the systems and methods described herein may update the current and/or proposed configuration details of the abstractions to reflect changes to the current and/or proposed configuration details of the computing devices. Moreover, by using compilers to transform configuration details of an abstraction of computing devices into configuration details for the computing devices and/or higher and/or lower level abstractions of the computing devices, the systems and methods described herein may update the proposed configuration details of the computing devices and/or higher and/or lower level abstractions of the computing devices to reflect changes to the proposed configuration details of the abstraction.

In some examples, by updating the proposed configuration details of computing devices and/or higher and/or lower level abstractions of the computing devices to reflect changes to the proposed configuration details of an abstraction of the computing devices, the systems and methods described herein may enable an administrator to see how the changes to the proposed configuration details of the abstraction will be reflected at higher and/or lower levels of abstraction. Moreover, by updating the proposed configuration details of computing devices and/or higher and/or lower level abstractions of the computing devices to reflect changes to the proposed configuration details of an abstraction of the computing devices, the systems and methods described herein may enable the administrator to fluidly inspect and/or modify configuration details at any level of abstraction.

Furthermore, by using compilers to transform configuration details of one version of an abstraction of a computing device into configuration details for another version of the abstraction, the systems and methods described herein may enable abstractions and/or models for managing abstractions to be versioned, updated, and/or upgraded.

For example, the systems and methods described herein may update the current and/or any proposed configuration details of each abstraction of a computing device in response to a change to the current and/or any proposed configuration details of the computing device by (1) transforming the current and/or proposed configuration details of the computing device into configuration details for each abstraction of the computing device and (2) using the configuration details for each abstraction of the computing device to update the current and/or proposed configuration details of each abstraction.

In another example, the systems and methods described herein may update the proposed configuration details of each level of abstraction in response to receiving, from an administrator, a request to modify proposed configuration details of the computing device and/or any of the abstractions of the computing device by (1) transforming the proposed configuration details into configuration details for each level of abstraction and (2) using the configuration details to update any related proposed configuration details at each level of abstraction.

Figure 10:
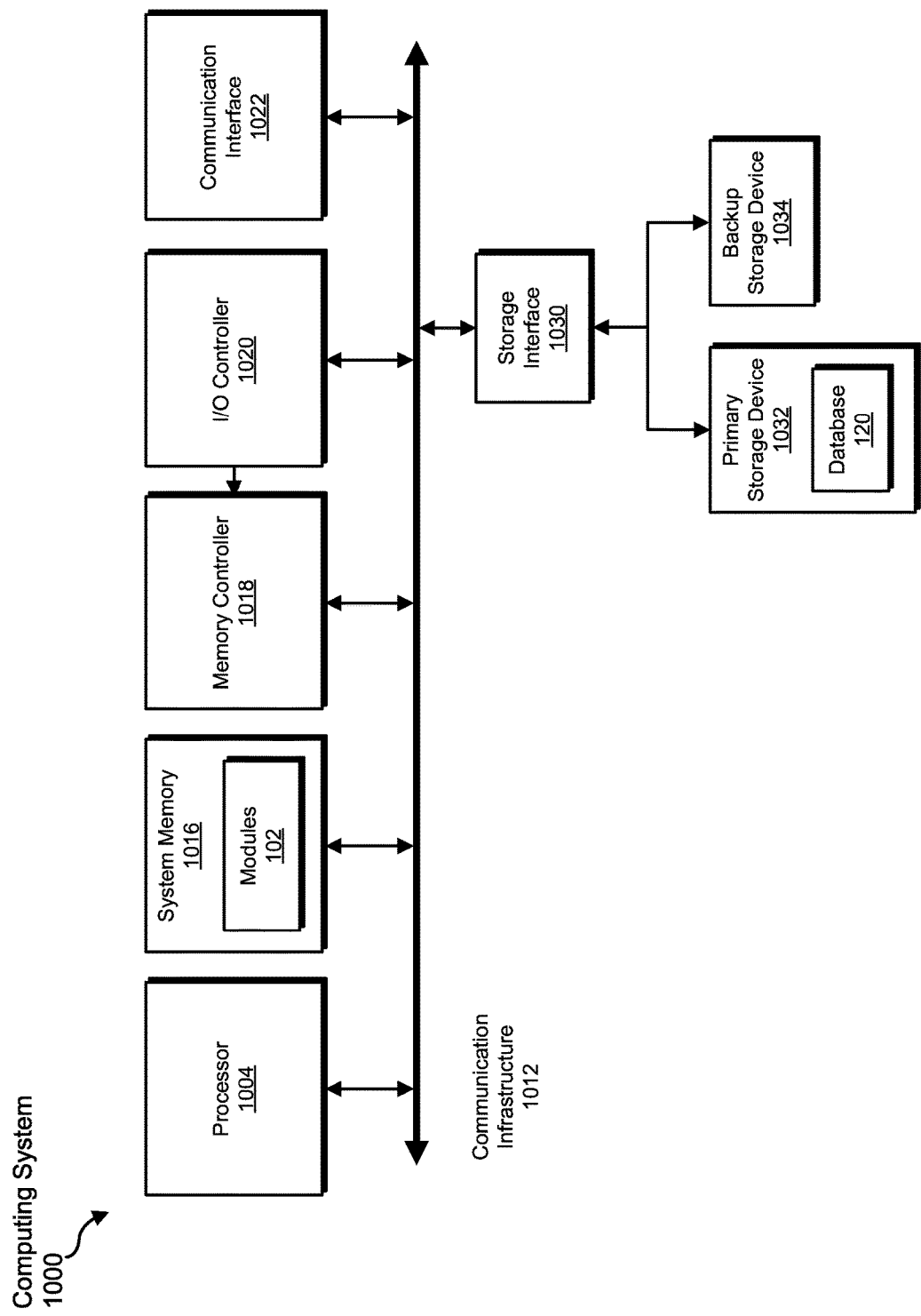
FIG. 10 is a block diagram of an exemplary computing system capable of implementing and/or being used in connection with one or more of the embodiments described and/or illustrated herein.

FIG. 10 is a block diagram of an exemplary computing system 1000 capable of implementing and/or being used in connection with one or more of the embodiments described and/or illustrated herein. In some embodiments, all or a portion of computing system 1000 may perform and/or be a means for performing, either alone or in combination with other elements, one or more of the steps described in connection with one or more of FIGS. 3, 5-7, and 9. All or a portion of computing system 1000 may also perform and/or be a means for performing and/or implementing any other steps, methods, or processes described and/or illustrated herein.

Computing system 1000 broadly represents any type or form of computing device, apparatus, or system, including a single or multi-processor computing device or system capable of executing computer-readable instructions. Examples of computing system 1000 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 1000 may be programmed, configured, and/or otherwise designed to comply with one or more networking protocols. According to certain embodiments, computing system 1000 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 1000 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 1000 may include various network and/or computing components. For example, computing system 1000 may include at least one processor 1014 and a system memory 1016. Processor 1014 generally represents any type or form of processing unit capable of processing data or interpreting and executing instructions. Processor 1014 may represent an application-specific integrated circuit (ASIC), a system on a chip (e.g., a network processor), a hardware accelerator, a general purpose processor, and/or any other suitable processing element.

Processor 1014 may process data according to one or more of the networking protocols discussed above. For example, processor 1014 may execute or implement a portion of a protocol stack, may process packets, may perform memory operations (e.g., queuing packets for later processing), may execute end-user applications, and/or may perform any other processing tasks.

System memory 1016 generally represents any type or form of volatile or non-volatile storage device or medium capable of storing data and/or other computer-readable instructions. Examples of system memory 1016 include, without limitation, Random Access Memory (RAM), Read Only Memory (ROM), flash memory, or any other suitable memory device. Although not required, in certain embodiments computing system 1000 may include both a volatile memory unit (such as, for example, system memory 1016) and a non-volatile storage device (such as, for example, primary storage device 1032, as described in detail below).

In some embodiments, system memory 1016 may be implemented as shared memory and/or distributed memory in a network device. System memory 1016 may also store packets and/or other information used in networking operations. In one example, one or more of modules 102 from FIG. 1 may be loaded into system memory 1016.

In certain embodiments, exemplary computing system 1000 may also include one or more components or elements in addition to processor 1014 and system memory 1016. For example, as illustrated in FIG. 10, computing system 1000 may include a memory controller 1018, an Input/Output (I/O) controller 1020, and a communication interface 1022, each of which may be interconnected via communication infrastructure 1012. Communication infrastructure 1012 generally represents any type or form of infrastructure capable of facilitating communication between one or more components of a computing device. Examples of communication infrastructure 1012 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 1018 generally represents any type or form of device capable of handling memory or data or controlling communication between one or more components of computing system 1000. For example, in certain embodiments memory controller 1018 may control communication between processor 1014, system memory 1016, and I/O controller 1020 via communication infrastructure 1012. In some embodiments, memory controller 1018 may include a Direct Memory Access (DMA) unit that may transfer data (e.g., packets) to or from a link adapter.

I/O controller 1020 generally represents any type or form of device or module capable of coordinating and/or controlling the input and output functions of a computing device. For example, in certain embodiments I/O controller 1020 may control or facilitate transfer of data between one or more elements of computing system 1000, such as processor 1014, system memory 1016, communication interface 1022, and storage interface 1030.

Communication interface 1022 broadly represents any type or form of communication device or adapter capable of facilitating communication between exemplary computing system 1000 and one or more additional devices. For example, in certain embodiments communication interface 1022 may facilitate communication between computing system 1000 and a private or public network including additional computing systems. Examples of communication interface 1022 include, without limitation, a link adapter, a wired network interface (such as a network interface card), a wireless network interface (such as a wireless network interface card), and any other suitable interface. In at least one embodiment, communication interface 1022 may provide a direct connection to a remote server via a direct link to a network, such as the Internet. Communication interface 1022 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 1022 may also represent a host adapter configured to facilitate communication between computing system 1000 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1022 may also enable computing system 1000 to engage in distributed or remote computing. For example, communication interface 1022 may receive instructions from a remote device or send instructions to a remote device for execution.

As illustrated in FIG. 10, exemplary computing system 1000 may also include a primary storage device 1032 and/or a backup storage device 1034 coupled to communication infrastructure 1012 via a storage interface 1030. Storage devices 1032 and 1034 generally represent any type or form of storage device or medium capable of storing data and/or other computer-readable instructions. For example, storage devices 1032 and 1034 may represent a magnetic disk drive (e.g., a so-called hard drive), a solid state drive, a floppy disk drive, a magnetic tape drive, an optical disk drive, a flash drive, or the like. Storage interface 1030 generally represents any type or form of interface or device for transferring data between storage devices 1032 and 1034 and other components of computing system 1000. In one example, database 120 from FIG. 1 may be stored in primary storage device 1032.

In certain embodiments, storage devices 1032 and 1034 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1032 and 1034 may also include other similar structures or devices for allowing computer software, data, or other computer-readable instructions to be loaded into computing system 1000. For example, storage devices 1032 and 1034 may be configured to read and write software, data, or other computer-readable information. Storage devices 1032 and 1034 may be a part of computing system 1000 or may be separate devices accessed through other interface systems.

Many other devices or subsystems may be connected to computing system 1000. Conversely, all of the components and devices illustrated in FIG. 10 need not be present to practice the embodiments described and/or illustrated herein. The devices and subsystems referenced above may also be interconnected in different ways from those shown in FIG. 10. Computing system 1000 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of power-redundant system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   receiving a request to transform configuration details of a device model of at least one computing device into configuration details for an abstraction model of a level-one logical abstraction of the computing device, wherein:
   the device model is a digital representation of the computing device;
   the configuration details of the device model are a digital representation of at least one of:
   a current configuration of the computing device;
   a proposed configuration of the computing device;
   the abstraction model is a digital representation of the level-one logical abstraction of the computing device;
   the configuration details of the abstraction model are a digital representation of at least one of:
   a current configuration of the level-one logical abstraction;
   a proposed configuration of the level-one logical abstraction;
   the computing device provides a first function;
   the level-one logical abstraction provides a second function that is built on top of the first function;

the second function of the level-one logical abstraction is configurable independent of the first function of the computing device;

in response to the request to transform the configuration details of the device model into configuration details for the abstraction model:

identifying an up compiler of the abstraction model that can transform the configuration details of the device model into configuration details of the abstraction model;

using the up compiler of the abstraction model to transform the configuration details of the device model into configuration details of the abstraction model;

using the configuration details of the abstraction model to perform a system-management action.

2. The computer-implemented method of claim 1, further comprising:

receiving a request to transform configuration details of an additional abstraction model of a level-two logical abstraction of the computing device into additional configuration details for the abstraction model, wherein:

the level-two logical abstraction provides a third function that is built on top of the second function;

the third function is configurable independent of the second function of the level-one logical abstraction;

the additional abstraction model is a digital representation of the level-two logical abstraction of the computing device;

the configuration details of the additional abstraction model are a digital representation of at least one of:

a current configuration of the level-two logical abstraction;

a proposed configuration of the level-two logical abstraction;

in response to the request to transform the configuration details of the additional abstraction model into additional configuration details for the abstraction model:

identifying a down compiler of the additional abstraction model that can transform the configuration details of the additional abstraction model into additional configuration details of the abstraction model;

using the down compiler to transform the configuration details of the additional abstraction model into additional configuration details of the abstraction model;

using the additional configuration details of the abstraction model to perform an additional system-management action.

3. The computer-implemented method of claim 2, wherein:

receiving the request to transform the configuration details of the additional abstraction model into additional configuration details for the abstraction model comprises receiving, from an administrator, a request to modify the configuration details of the additional abstraction model;

using the additional configuration details of the abstraction model to perform the additional system-management action comprises displaying the additional configuration details of the abstraction model such that the administrator can review how modifying the configuration details of the additional abstraction model affects the configuration details of the abstraction model.

4. The computer-implemented method of claim 2, wherein using the down compiler to transform the configuration details of the additional abstraction model into the additional configuration details of the abstraction model comprises maintaining supplemental information that enables transforming the additional configuration details of the abstraction model back into the configuration details of the additional abstraction model.

5. The computer-implemented method of claim 1, further comprising:

receiving a request to transform the configuration details of the abstraction model into configuration details for an additional abstraction model of a level-two logical abstraction of the computing device, wherein:

the level-two logical abstraction provides a third function that is built on top of the second function;

the third function is configurable independent of the second function of the level-one logical abstraction;

the additional abstraction model is a digital representation of the level-two logical abstraction of the computing device;

the configuration details of the additional abstraction model are a digital representation of at least one of:

a current configuration of the level-two logical abstraction;

a proposed configuration of the level-two logical abstraction;

in response to the request to transform the configuration details of the abstraction model into configuration details for the additional abstraction model:

identifying an additional up compiler of the additional abstraction model that can transform the configuration details of the abstraction model into configuration details of the additional abstraction model;

using the additional up compiler to transform the configuration details of the abstraction model into configuration details of the additional abstraction model;

using the configuration details of the additional abstraction model to perform an additional system-management action.

6. The computer-implemented method of claim 5, wherein:

receiving the request to transform the configuration details of the abstraction model into configuration details for the additional abstraction model comprises receiving, from an administrator, a request to modify the configuration details of the abstraction model;

using the configuration details of the additional abstraction model to perform the additional system-management action comprises displaying the configuration details of the additional abstraction model such that the administrator can review how modifying the configuration details of the abstraction model affects the configuration details of the additional abstraction model.

7. The computer-implemented method of claim 1, further comprising:

receiving a request to transform the configuration details of the abstraction model into configuration details for a newer version of the abstraction model;

in response to the request to transform the configuration details of the abstraction model into configuration details for the newer version of the abstraction model:

identifying a forward compiler of the newer version of the abstraction model that can transform the configuration details of the abstraction model into configuration details of the newer version of the abstraction model;

using the forward compiler to transform the configuration details of the abstraction model into configuration details of the newer version of the abstraction model;
using the configuration details of the newer version of the abstraction model to perform an additional system-management action.

8. The computer-implemented method of claim 1, further comprising:
receiving a request to transform the configuration details of the abstraction model into configuration details for an older version of the abstraction model;
in response to the request to transform the configuration details of the abstraction model into configuration details for the older version of the abstraction model:
identifying a backward compiler of the abstraction model that can transform the configuration details of the abstraction model into configuration details of the older version of the abstraction model;
using the backward compiler to transform the configuration details of the abstraction model into configuration details of the older version of the abstraction model;
using the configuration details of the older version of the abstraction model to perform an additional system-management action.

9. The computer-implemented method of claim 1, wherein:
the configuration details of the device model are a digital representation of how the computing device is currently configured;
the configuration details of the abstraction model are a digital representation of current configuration details of the abstraction model that correspond to how the computing device is currently configured, further comprising:
detecting a change to how the computing device is currently configured;
in response to detecting the change:
updating the current configuration details of the device model to reflect the change;
updating the current configuration details of the abstraction model to reflect the change by using the up compiler to transform the updated current configuration details of the device model into updated current configuration details for the abstraction model.

10. The computer-implemented method of claim 1, wherein:
the configuration details of the device model are a digital representation of a proposed configuration for the computing device;
the configuration details of the abstraction model are a digital representation of proposed configuration details for the abstraction model that correspond to the proposed configuration for the computing device, further comprising:
detecting a change to how the computing device is currently configured;
in response to detecting the change:
updating the proposed configuration details of the device model to reflect the change;
updating the proposed configuration details of the abstraction model to reflect the change by using the up compiler to transform the updated proposed configuration details of the device model into updated proposed configuration details for the abstraction model.

11. The computer-implemented method of claim 10, wherein updating the proposed configuration details of the device model comprises:
determining whether the change conflicts with the proposed configuration details of the device model;
notifying, in response to determining that the change conflicts with the proposed configuration details of the device model, an administrator of the conflict.

12. The computer-implemented method of claim 10, wherein the proposed configuration details of the device model are a digital representation of pending configuration details of the device model that are scheduled to update how the computing device is configured.

13. The computer-implemented method of claim 10, wherein updating the proposed configuration details of the abstraction model comprises:
determining whether the change conflicts with the proposed configuration details of the abstraction model;
notifying, in response to determining that the change conflicts with the proposed configuration details of the abstraction model, an administrator of the conflict.

14. A system comprising:
a receiving module that receives a request to transform configuration details of a device model of at least one computing device into configuration details for an abstraction model of a level-one logical abstraction of the computing device, wherein:
the device model is a digital representation of the computing device;
the configuration details of the device model are a digital representation of at least one of:
a current configuration of the computing device;
a proposed configuration of the computing device;
the abstraction model is a digital representation of the level-one logical abstraction of the computing device;
the configuration details of the abstraction model are a digital representation of at least one of:
a current configuration of the level-one logical abstraction;
a proposed configuration of the level-one logical abstraction;
the computing device provides a first function;
the level-one logical abstraction provides a second function that is built on top of the first function;
the second function of the level-one logical abstraction is configurable independent of the first function of the computing device;
a compiling module that:
identifies an up compiler of the abstraction model that can transform the configuration details of the device model into configuration details of the abstraction model;
uses, in response to the request to transform the configuration details of the device model into configuration details for the abstraction model, the up compiler of the abstraction model to transform the configuration details of the device model into configuration details of the abstraction model;
a returning module that uses, in response to the request to transform the configuration details of the device model into configuration details for the abstraction model, the configuration details of the abstraction model to perform a system-management action;

at least one physical processor configured to execute the receiving module, the compiling module, and the returning module.

15. The system of claim 14, wherein:
the receiving module receives a request to transform configuration details of an additional abstraction model of a level-two logical abstraction of the computing device into additional configuration details for the abstraction model, wherein:
the level-two logical abstraction provides a third function that is built on top of the second function;
the third function is configurable independent of the second function of the level-one logical abstraction;
the additional abstraction model is a digital representation of the level-two logical abstraction of the computing device;
the configuration details of the additional abstraction model are a digital representation of at least one of:
a current configuration of the level-two logical abstraction;
a proposed configuration of the level-two logical abstraction;
in response to the request to transform the configuration details of the additional abstraction model into additional configuration details for the abstraction model:
the compiling module:
identifies a down compiler of the additional abstraction model that can transform the configuration details of the additional abstraction model into additional configuration details of the abstraction model;
uses the down compiler to transform the configuration details of the additional abstraction model into additional configuration details of the abstraction model;
the returning module uses the additional configuration details of the abstraction model to perform an additional system-management action.

16. The system of claim 15, wherein:
the receiving module receives the request to transform the configuration details of the additional abstraction model into additional configuration details for the abstraction model by receiving, from an administrator, a request to modify the configuration details of the additional abstraction model;
the returning module uses the additional configuration details of the abstraction model to perform the additional system-management action by displaying the additional configuration details of the abstraction model such that the administrator can review how modifying the configuration details of the additional abstraction model affects the configuration details of the abstraction model.

17. The system of claim 14, wherein:
the receiving module receives a request to transform the configuration details of the abstraction model into configuration details for an additional abstraction model of a level-two logical abstraction of the computing device, wherein:
the level-two logical abstraction provides a third function that is built on top of the second function;
the third function is configurable independent of the second function of the level-one logical abstraction;
the additional abstraction model is a digital representation of the level-two logical abstraction of the computing device; the configuration details of the additional abstraction model are a digital representation of at least one of:
a current configuration of the level-two logical abstraction;
a proposed configuration of the level-two logical abstraction;
in response to the request to transform the configuration details of the abstraction model into configuration details for the additional abstraction model:
the compiling module:
identifies an additional up compiler of the additional abstraction model that can transform the configuration details of the abstraction model into configuration details of the additional abstraction model;
uses the additional up compiler to transform the configuration details of the abstraction model into configuration details of the additional abstraction model;
the returning module uses the configuration details of the additional abstraction model to perform an additional system-management action.

18. The system of claim 17, wherein:
the receiving module receives the request to transform the configuration details of the abstraction model into configuration details for the additional abstraction model by receiving, from an administrator, a request to modify the configuration details of the abstraction model;
the returning module uses the configuration details of the additional abstraction model to perform the additional system-management action by displaying the configuration details of the additional abstraction model such that the administrator can review how modifying the configuration details of the abstraction model affects the configuration details of the additional abstraction model.

19. The system of claim 14, wherein:
the configuration details of the device model are a digital representation of how the computing device is currently configured;
the configuration details of the abstraction model are a digital representation of how the computing device is currently configured, further comprising:
a detecting module that detects a change to how the computing device is currently configured;
an updating module that, in response to detecting the change:
updates the current configuration details of the device model to reflect the change;
updates the current configuration details of the abstraction model to reflect the change by using the up compiler to transform the updated current configuration details of the device model into updated current configuration details for the abstraction model.

20. A non-transitory computer-readable-storage medium comprising one or more computer-readable instructions that, when executed by at least one processor of a computing device, cause the computing device to:
receive a request to transform configuration details of a device model of at least one additional computing device into configuration details for an abstraction model of a level-one logical abstraction of the additional computing device, wherein:

the device model is a digital representation of the computing device;
the configuration details of the device model are a digital representation of at least one of:
  a current configuration of the additional computing device;
  a proposed configuration of the additional computing device;
the abstraction model is a digital representation of the level-one logical abstraction of the additional computing device;
the configuration details of the abstraction model are a digital representation of at least one of:
  a current configuration of the level-one logical abstraction;
  a proposed configuration of the level-one logical abstraction;
the additional computing device provides a first function;
the level-one logical abstraction provides a second function that is built on top of the first function;
the second function of the level-one logical abstraction is configurable independent of the first function of the additional computing device;
in response to the request to transform the configuration details of the device model into configuration details for the abstraction model:
  identify an up compiler of the abstraction model that can transform the configuration details of the device model into configuration details of the abstraction model;
  use the up compiler of the abstraction model to transform the configuration details of the device model into configuration details of the abstraction model;
  use the configuration details of the abstraction model to perform a system-management action.

* * * * *